(12) United States Patent
Casaccia

(10) Patent No.: US 6,807,428 B2
(45) Date of Patent: Oct. 19, 2004

(54) METHOD AND APPARATUS FOR TIME-BASED RECEPTION OF TRANSMISSIONS IN A WIRELESS COMMUNICATION SYSTEM

(75) Inventor: Lorenzo Casaccia, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 45 days.

(21) Appl. No.: 10/092,644

(22) Filed: Mar. 6, 2002

(65) Prior Publication Data
US 2003/0036400 A1 Feb. 20, 2003

Related U.S. Application Data

(63) Continuation-in-part of application No. 09/931,730, filed on Aug. 16, 2001.

(51) Int. Cl.[7] ................................................ H04Q 1/00
(52) U.S. Cl. ........................ 455/515; 455/84; 455/82; 370/394; 340/10.6
(58) Field of Search ...................... 455/515, 84, 82; 340/10.6; 370/394

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 5,504,773 A | 4/1996 | Padovani et al. |
| 5,850,187 A * | 12/1998 | Carrender et al. ......... 340/10.6 |
| 5,930,233 A | 7/1999 | Kanerva et al. ............ 370/231 |
| 6,076,181 A | 6/2000 | Cheng ........................ 714/748 |
| 6,148,005 A * | 11/2000 | Paul et al. .................. 370/469 |
| 6,208,663 B1 * | 3/2001 | Schramm et al. ........... 370/465 |
| 6,226,301 B1 | 5/2001 | Cheng et al. |
| 6,452,905 B1 * | 9/2002 | Smith et al. ............. 370/236.1 |

FOREIGN PATENT DOCUMENTS

| | | |
|---|---|---|
| WO | 9953631 | 10/1999 |
| WO | 0113542 | 2/2001 |
| WO | 0137473 | 5/2001 |

* cited by examiner

Primary Examiner—Nay Maung
Assistant Examiner—Alan T. Gantt
(74) Attorney, Agent, or Firm—Philip R. Wadsworth; Sandra L. Godsey

(57) ABSTRACT

Method for segmented message transmission wherein each message is first divided into segments and the segments are fragmented. A segment parameter is applied to each segment, and a segment identifier to each fragment. The fragments are provided to a lower level for preparation into frames for transmission. One embodiment is applied to the transmission of short duration messages, such as control messages. On receipt of a frame within a segment, a timer is initiated having an expiration period. Receipt of a next frame in the segment stops the timer. Expiration of the expiration period for a timer indicates that a next sequential frame is lost.

6 Claims, 19 Drawing Sheets

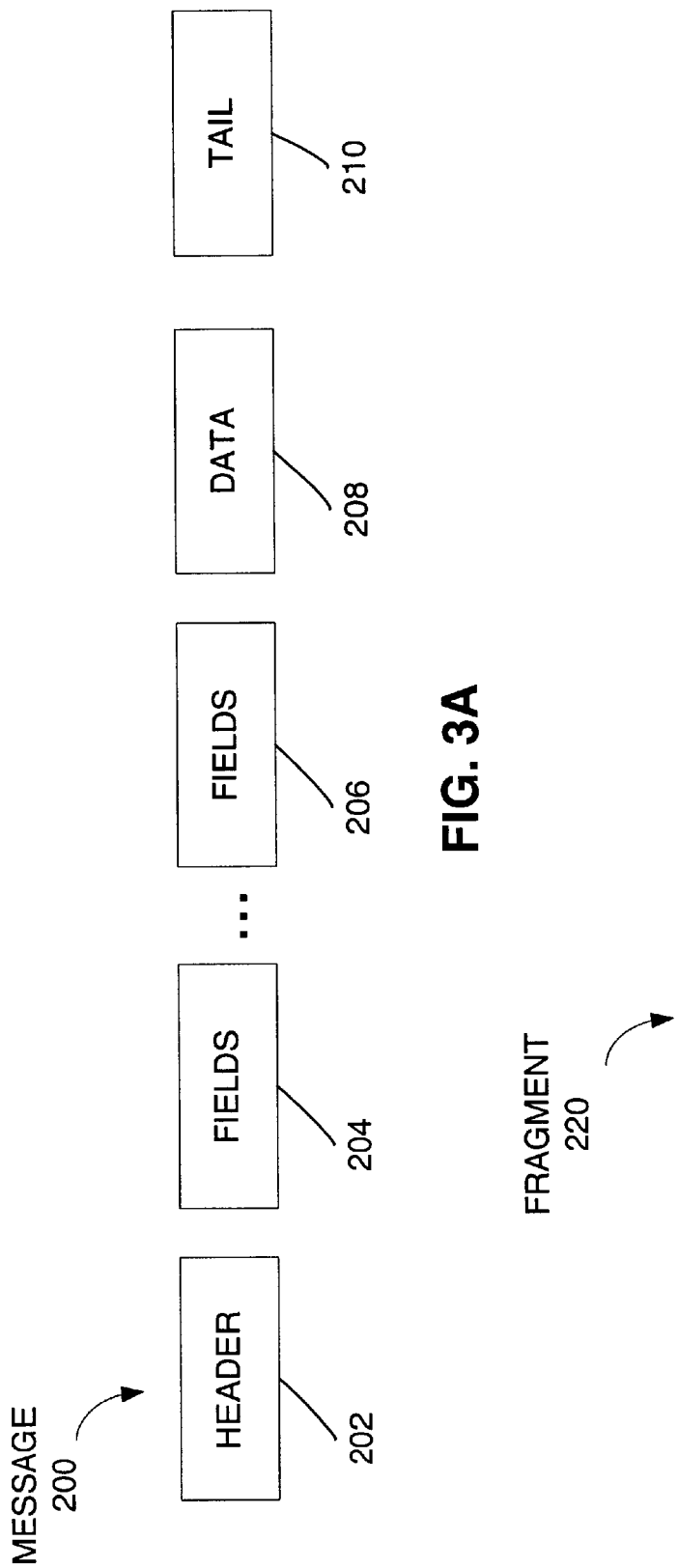

| SEGMENTATION | SEGMENT START | SEGMENT END |
|---|---|---|
| 1 = ACTIVE | 1=SEGMENT START | 1=SEGMENT END |
| 0=INACTIVE | 0=ELSE | 0=ELSE |

FIG. 5B

| $SI_1$ | $SI_2$ | $SI_3$ | DEFINITION |
|---|---|---|---|
| 0 | 0 | 0 | SEGMENTATION INACTIVE |
| 0 | 0 | 1 | SEGMENTATION INACTIVE |
| 0 | 1 | 0 | SEGMENTATION INACTIVE |
| 0 | 1 | 1 | SEGMENTATION INACTIVE |
| 1 | 0 | 0 | SEGMENT MIDDLE |
| 1 | 0 | 1 | SEGMENT END |
| 1 | 1 | 0 | SEGMENT START |
| 1 | 1 | 1 | RESERVED |

FIG. 5C

| SEGMENTATION | SEGMENT START |
|---|---|
| 1 = ACTIVE | 1=SEGMENT START |
| 0=INACTIVE | 0=ELSE |

FIG. 5D

| $SI_1$ | $SI_2$ | DEFINITION |
|---|---|---|
| 0 | 0 | SEGMENTATION INACTIVE |
| 0 | 1 | SEGMENTATION INACTIVE |
| 1 | 1 | SEGMENT START |
| 1 | 0 | SEGMENT CONTINUATION |

FIG. 5E

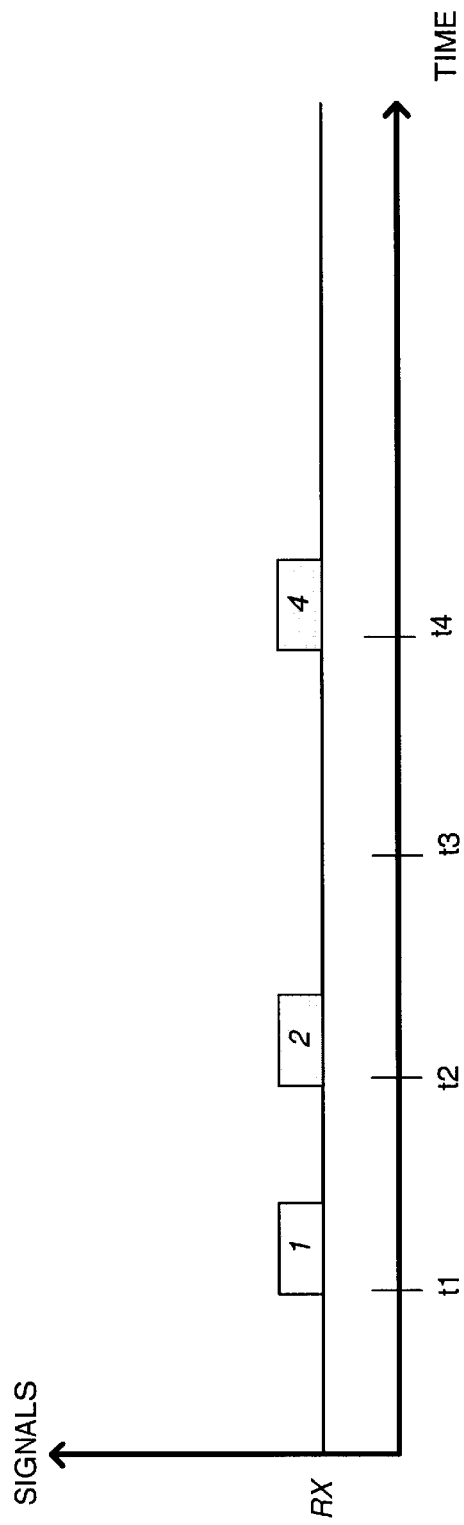
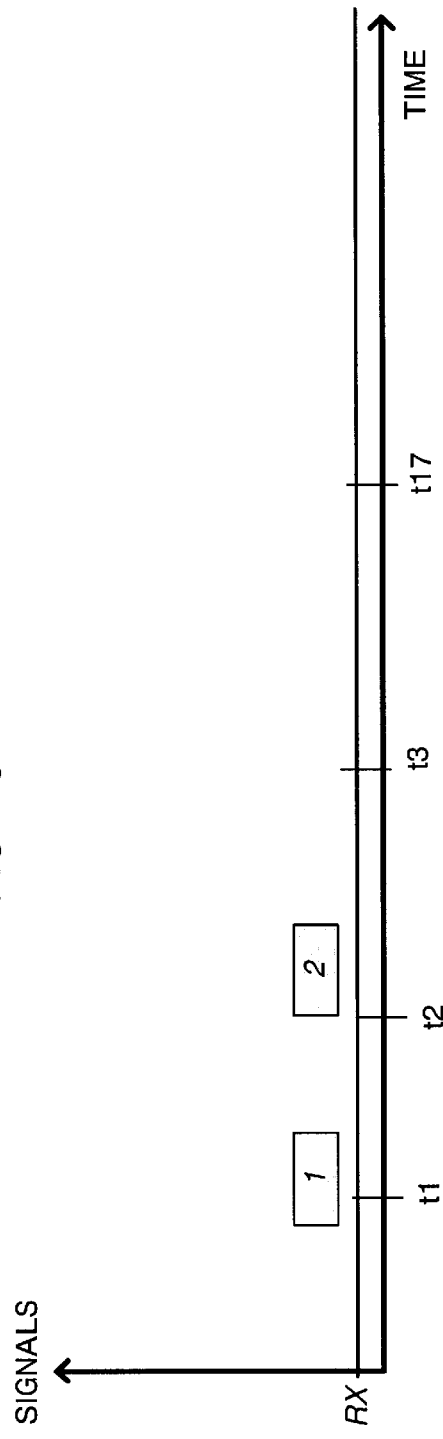

METHOD AND APPARATUS FOR TIME-BASED RECEPTION OF TRANSMISSIONS IN A WIRELESS COMMUNICATION SYSTEM

The present Application for Patent is a Continuation in Part and claims priority to patent application Ser. No. 09/931,730 entitled "METHOD AND APPARATUS FOR TIME-BASED RECEPTION OF TRANSMISSIONS IN A WIRELESS COMMUNICATION SYSTEM" filed Aug. 16, 2001, and assigned to the assignee hereof and hereby expressly incorporated by reference herein.

BACKGROUND

1. Field

The present invention relates to communications systems. Specifically, the present invention relates to methods for segmenting and transmitting messages in a wireless communication system.

2. Background

In a wireless communications system messages are transmitted from a transmitter to a mobile receiver. Messages are transmitted in frames, wherein a frame defines a predetermined period of time and a protocol is the set of procedures used to perform a given set of operations, such as the exchange of information, wherein a protocol defines the constituent information transmitted in a frame. As wireless communications are performed through a shared air interface, reception quality is interference limited. Poor quality reception at the receiver may result in the loss of a transmitted frame of data, i.e., received signal is not recognizable due to the addition of interference signals. When a frame is lost, typically, the entire message (multiple frames) is retransmitted. Retransmission of an entire message uses bandwidth otherwise used for additional messages. Additionally, retransmission adds to the delay time of a system, and may result in unacceptable performance of the wireless communication system.

Therefore, there is a need for an accurate method of transmitting messages in a wireless communication system. Additionally, there is a need for an efficient method of retransmitting information in a wireless communication system.

SUMMARY

Embodiments disclosed herein address the above stated needs by providing a method and apparatus for detecting an end of segment or end of message in a transmission. On receipt of a frame erasure, the receiver initiates a timer. The timer is used to determine a missing end of frame. Multiple timers may be implemented, wherein each timer stops any previously running timers.

According to one aspect, in a wireless communication system having a base station controller and a plurality of base stations, each of the plurality of base stations adapted for communication with a plurality of mobile stations, a method includes receiving a plurality of transmission frames, each of the plurality of transmission frames having an identifier, detecting a first frame erasure within the plurality of transmission frames, initiating a first timer, and on expiration of the first timer determining the identification of the first frame erasure.

According to another aspect, a wireless apparatus includes a receiver for receiving a plurality of transmission frames, a means for detecting a frame erasure, a first timer means responsive to detection of a first frame erasure, and a second timer means responsive to detection of a second frame erasure.

BRIEF DESCRIPTION OF THE DRAWINGS

FIG. 3A is a message transmission protocol applicable in a wireless communication system.

FIG. 3B is a frame configuration according to a transmission protocol such as illustrated in FIG. 3A.

FIG. 5B is a legend defining segmentation indicator bit values used in a message transmission protocol such as illustrated in FIG. 5A.

FIG. 5C is a legend defining segmentation indicator combinations used in a message transmission protocol such as illustrated in FIG. 5A.

FIG. 5D is a legend defining segmentation indicator bit values used in a message transmission protocol such as illustrated in FIG. 5A.

FIG. 5E is a legend defining segmentation indicator combinations used in a message transmission protocol such as illustrated in FIG. 5A.

FIG. 13A and FIG. 13B are timing diagrams of examples illustrating a process of identifying a missing end of a segment fragment for a frame.

DETAILED DESCRIPTION

Figure 1:
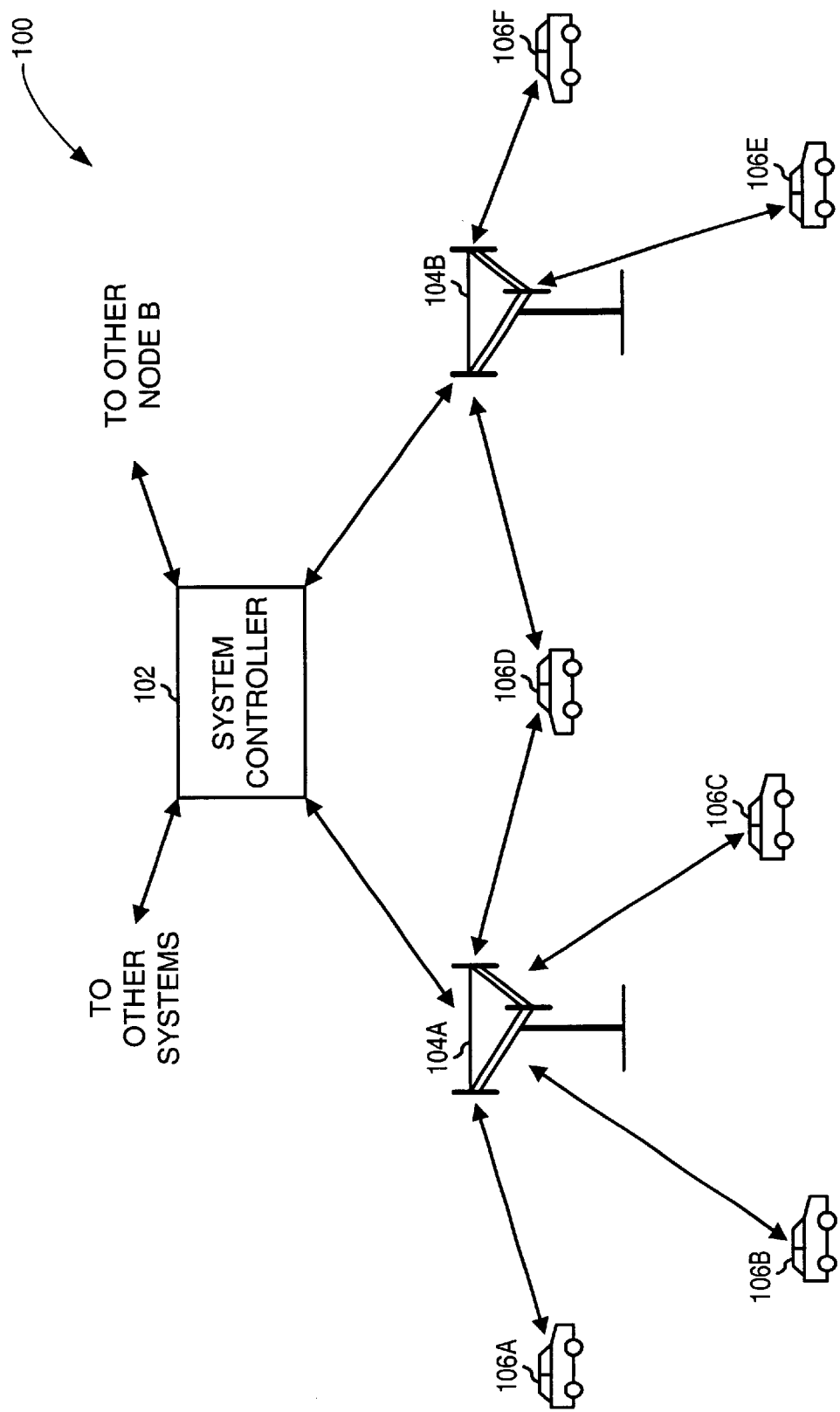
FIG. 1 is a wireless communication system.

The word "exemplary" is used exclusively herein to mean "serving as an example, instance, or illustration." Any embodiment described herein as "exemplary" is not necessarily to be construed as preferred or advantageous over other embodiments.

In a spread spectrum system, such as a Code Division Multiple Access, CDMA, communications system, signals are spread over a wide bandwidth via the use of a code, such as a Pseudorandom Noise, PN, spreading sequence. The "TIA/EIA/IS-95 Mobile Station-Base Station Compatibility Standard for Dual-Mode Wideband Spread Spectrum Cellular System," hereinafter referred to as "the IS-95 standard," and the "TIA/EIA/IS-2000 Standards for cdma2000 Spread Spectrum Systems," hereinafter referred to as "the cdma2000 standard," detail spread spectrum CDMA systems.

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, or (4) some other wireless standard. The standards (1), (2), and (3) cited hereinabove are hereby expressly incorporated herein by reference.

Each standard specifically defines the processing of data for transmission from base station to mobile, and vice versa. For example, speech information may be coded at a particular data rate, formatted into a defined frame format, and processed (e.g., error correction and/or detection encoded, interleaved, and so on) in accordance with a particular processing scheme. As an illustration of this, the W-CDMA standard defines an Adaptive Multi-Rate, or AMR, speech coding scheme whereby speech information may be encoded based on one of a number of possible data rates and the coded speech data is provided in a particular format that depends on the selected data rate. The codec, frame formats and processing defined by a particular standard (e.g., cdma2000 standard) are likely to be different from those of other standards (e.g., W-CDMA standard).

There are any numbers of communication systems capable of supporting multiple transport formats, i.e., variable length transmission frames. One such system is defined by the cdma2000 standard. While a CDMA type system is used as an exemplar throughout the following discussion, the present methods and apparatus are applicable to any system that transmits messages in frames, and supports retransmission of frames and/or portions of a frame. Additionally, the methods described herein may be applied to forward link and reverse link, as well as downlink and uplink. For convenience, the descriptions herein use terminology consistent with a CDMA type system. For application to a W-CDMA type system, an uplink communication refers to a communication from a User Equipment, UE, to a node B, i.e., transmitter.

While some of the terminology used to describe a conventional CDMA type spread spectrum system is consistently used with respect to a W-CDMA type system, there are several terms having specific definitions in each type system.

In a CDMA system, a mobile user is referred to as a Mobile Station. Multiple MSs communicate through a Base Station having a fixed location in the wireless communication system. The Reverse Link, RL, in a CDMA system refers to transmissions from a mobile user or Mobile Station, MS, to a Base Station, BS. The Forward Link, FL, refers to transmissions from the BS to a MS.

The terminology specific to a W-CDMA system refers to the mobile users as User Equipment, UE. Multiple UEs communicate through a "Node B" having a fixed location in the wireless communication system. Transmissions from the UE to the Node B are referred to as Up Link, UL. Down Link, DL, refers to transmissions from the Node B to the UE.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. System 100 may represent a CDMA wireless communication system, wherein each of the remote terminals 106 is referred to as a MS. Similarly, system 100 may represent a W-CDMA wireless communication system, wherein each of the remote terminals 106 is referred to as a UE. Each remote terminal 106 may communicate with one or more base stations 104 on the forward and reverse links at any particular moment, depending on whether or not the remote terminal is active and whether or not it is in soft handoff. For clarity of understanding, an exemplary embodiment is considered, wherein the system 100 is a CDMA type system consistent with the cdma2000 standard.

As shown in FIG. 1, base station 104a communicates with remote terminals 106a, 106b, 106c, and 106d, and base station 104b communicates with remote terminals 106d, 106e, and 106f.

A system controller 102 couples to base stations 104 and typically further couples to other systems, including, but not limited to, a Public Switched Telephone Network, PSTN, the Internet, or other communication network. System controller 102 provides coordination and control for the base stations coupled to it. System controller 102 further controls, via base stations 104, the routing of telephone calls among remote terminals 106, and between remote terminals 106 and the users coupled to other systems. System controller 102 is also referred to as a Base Station Controller, BSC.

Figure 2:
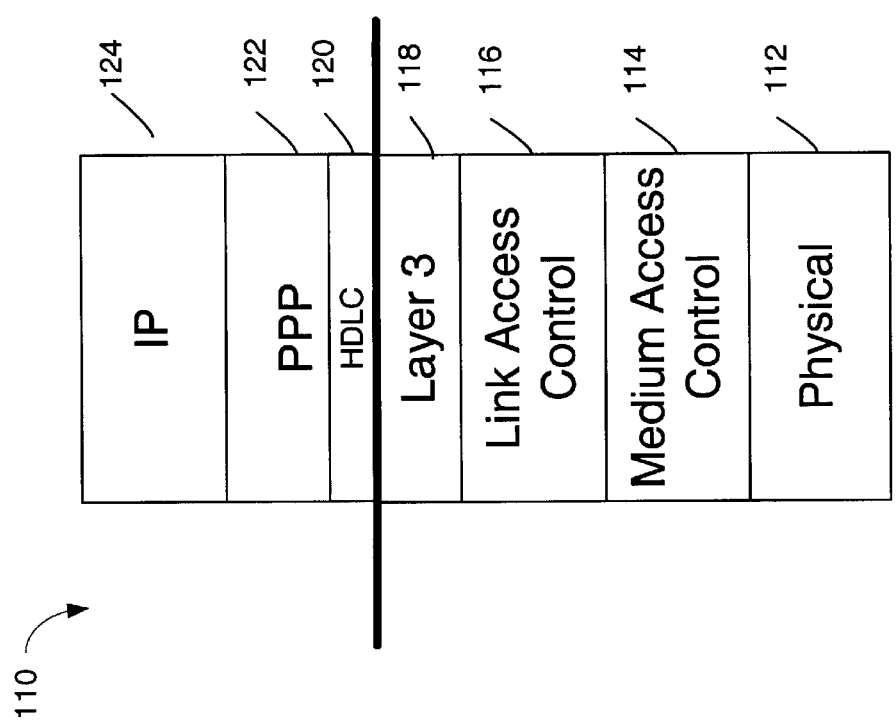
FIG. 2 is an architectural layering for implementing protocols in a wireless communication system.

FIG. 2 illustrates an architectural layering 110 of an exemplary embodiment of the present invention. The physical layer 112 indicates the channel structure, frequency, power output, modulation type, and encoding specifications for the forward and reverse links. The Medium Access Control, MAC, layer 114 defines the procedures used to receive and transmit over the physical layer 112.

The layered structure illustrated in FIG. 2 is designed to provide voice, packet data, and voice and packet data services simultaneously. The physical layer 112 performs coding, interleaving, modulation and spreading functions for the physical channels. The MAC layer 114 and the Link Access Control, LAC, layer 116 together form a link layer to provide protocol support and control mechanisms for data transport services. The link layer further maps the data transport needs of higher layers into specific capabilities and characteristics of the physical layer 112. The link layer also maps logical and signaling channels into code channels specifically supported by the coding and modulation functions of the physical layer 112. As used herein, signaling refers to the transmission of control information, but may be extended to include data information or other information transmitted as messages in a communications system.

Control applications and high layer protocols utilize the services provided by the LAC layer 116. The LAC layer 116 performs the functions essential to set up, maintain, and release a logical link connection, including delivery of messages. The MAC layer 114 provides a control function that manages resources supplied by the physical layer 112. For example, the MAC layer 114 controls the physical code channels for communication of information over-the-air interface. The MAC layer 114 further coordinates the usage of those resources desired by various LAC service entities. Such coordination function resolves contention issues between LAC service entities within a single mobile station, as well as between competing mobile stations. The MAC layer 114 delivers Quality of Service, QoS, level requests from LAC services. For example, the MAC may reserve air interface resources or resolve priorities between competing LAC service entities.

For an HDR system, the MAC layer 114 includes scheduling capabilities to balance users or connections. Such balancing typically schedules low throughput for channels with poor coverage, thus freeing up resources allowing high throughput for channels with good connections. The next layer, the Link Access Control, LAC, layer 116, provides an access procedure for higher layer applications. In alternate architectures, a radio link, the Radio Link Protocol, RLP, layer (not shown) may provide retransmission and duplicate detection for an octet-aligned data stream in place of or in parallel with the LAC layer 116. In the context of a packet service, the LAC layer 116 carries Point-to-Point Protocol, PPP, packets. The High Level Data Link Control HDLC layer 120 is a link layer for PPP and ML-PPP communications. Control information is placed in specific patterns, which are dramatically different from the data in order to reduce errors. The HDLC layer 120 performs framing of the data prior to PPP processing. The PPP layer 122 then provides compression, authentication, encryption and multi-protocol support. The Internet Protocol, IP, layer 124 keeps track of Internet work addressing for different nodes, routes outgoing messages, and recognizes incoming messages.

Protocols running on top of PPP, such as IP layer 124, carry user traffic. Note that each of these layers may contain one or more protocols. Protocols use signaling messages and/or headers to convey information to a peer entity on the other side of the air-interface. For example, in a High Data Rate, HDR, system, protocols send messages with a default signaling application.

The architecture 110 is applicable to an Access Network, AN, for providing data connectivity between an IP network, such as the Internet, and access terminals, including wireless mobile units. Access Terminals, ATs, provide data connectivity to a user. An AT may be connected to a computing device such as a laptop personal computer or may be a self-contained data device such as a personal digital assistant. There are a variety of wireless applications and an ever-increasing number of devices, often referred to as IP appliances or web appliances. As illustrated in FIG. 2, layers above the LAC layer 116 are service network layers and layers below the HDLC layer 120 are radio network layers. In other words, the radio network layers affect the air-interface protocols. The radio network layers of the exemplary embodiment implement the "TL80-54421-1 HDR Air Interface Specification" referred to as "the HAI specification." The HAI specification is sometimes referred to as "1xEVDO." HDR generally provides an efficient method of transmitting data in a wireless communication system. Alternate embodiments may implement the "TIA/EIA/IS-2000 Standards for cdma2000 Spread Spectrum Systems" referred to as "the cdma2000 standard," the "TIA/EIA/IS-95 Mobile Station-Base Station Compatibility Standard for Dual-Mode Wideband Spread Spectrum Cellular System," hereinafter referred to as "the IS-95 standard," or other per-user connection systems, such as the "ANSI J-STD-01 Draft Standard for W-CDMA (Wideband Code Division Multiple Access) Air Interface Compatibility Standard for 1.85 to 1.99 GHz PCS Applications" referred to as "W-CDMA."

The use of a multiple access system for voice and data transmissions is disclosed in the following U.S. Patents:

U.S. Pat. No. 4,901,307, entitled "SPREAD SPECTRUM MULTIPLE ACCESS COMMUNICATION SYSTEM USING SATELLITE OR TERRESTRIAL REPEATERS;"

U.S. Pat. No. 5,103,459, entitled "SYSTEM AND METHOD FOR GENERATING WAVEFORMS IN A CDMA CELLULAR TELEPHONE SYSTEM;"

U.S. Pat. No. 5,504,773, entitled "METHOD AND APPARATUS FOR FORMATTING OF DATA FOR TRANSMISSION;" each assigned to the assignee hereof and expressly incorporated by reference herein. As the frequency spectrum is a finite resource, these systems provide methods for maximizing the use of this resource by sharing the spectrum while supporting a large number of users with minimal interference. The extension of these methods to the high speed transmission of data allows reuse of existing hardware and software. Designers already familiar with such standards and methods may use this knowledge and experience to extend these systems to high speed data transmissions.

As described hereinabove, in preparing a message for transmission, the transmitter typically spreads the message over multiple frames. The Frame Error Rate, FER, associated with a given communication link is defined as the probability of losing a given frame. Similarly, the Message Error Rate, MER, associated with a given communication link is defined as the probability of losing a given message. The MER is related to the FER as given in equation (1).

$$\text{MER}=1-(1-\text{FER})^n, \quad (1)$$

wherein the message is spread over n frames. Equation (1) assumes a statistical independence of events, specifically; the probability of an error in any given frame is equal to the probability of an error in any other frame. For a fixed FER value, the MER increases with increases in message length. If one frame is lost, the entire message is lost. Note that a frame is a basic timing interval in a wireless communication system. The time length defining a frame for different transmission channels may be different.

The risk of losing a message, i.e., MER, increases with the length of the message. As the message length increases, the number of frames required for transmission of the message increases. As the loss of one frame will result in the loss of the entire message, the risk of losing the message is affected by the number of frames per message. Additionally, for a constant length message, increases in the FER directly impacts the MER as given in equation (1).

FIGS. 3A and 3B illustrate a transmission protocol implemented in a LAC layer 116, wherein each message 200 includes multiple fields including: a header 202; multiple fields 204 to 206; data 208; and a tail 210. The header 202 includes control information for transmission and receipt of the message, including but not limited to, message length message identifier, protocol version discriminator, etc. The fields 204 to 206 include any number of fields, including but not limited to addressing fields, encryption fields, authentication field and fields that are used to provide message retransmissions (ARQ). In one embodiment, the data field 208 provides signaling information, such as control messages, from the transmitter to receiver. The tail frame 210 includes termination information for the message, including a Code Redundancy Check, or CRC, to ensure the correctness of the message.

The message 200 is transmitted in a number of fragments, labeled as 1, 2, . . . , X. Each fragment 220 includes a Start Of Message, SOM, indicator 222, and an information portion 224. In one embodiment, the SOM is a one to indicate a first fragment in the message, and a zero to indicate successive fragments in the message. The MER of the message 200 is given in equation (1). The fragments are then provided to the MAC layer 114, which arranges the fragments into frames for transmission. The MAC layer 114 may add information to the fragments and may reorder the fragments for transmission. Each fragment 220 may correspond to a transmission frame. On receipt of the message at a receiver, if any fragment is lost, the entire message is retransmitted. A lost fragment is typically referred to as an erasure, wherein the receiver receives signal energy but is unable to process and/or decode the information. If a portion of a message is lost, the entire message may be considered lost if the receiver is not able to process the message without the lost portion. The lost portion may be referred to as an erasure or a missing portion.

In one system, when the receiver receives a message and is able to decode and process the message, the receiver acknowledges the receipt of the message by transmission of an Acknowledgement, ACK, message. If the message is lost, the receiver does not respond to the transmitter. The transmitter waits for receipt of the ACK message from the target recipient. If the ACK message is not received at the transmitter within a predetermined wait time period, the transmitter retransmits the message. The transmitter has little or no information as to the lost portion(s) of the message.

The retransmission of a message on the loss of only a portion, or fragment, of the message and upon the expiration of a wait time incurs delay time to the receiver and consumes transmission bandwidth of the transmitter. To provide retransmission of the lost portion(s) or fragment(s) an exemplary embodiment of the present invention provides a method of message segmentation, illustrated in FIGS. 4A and 4B, that separates the message 200 into multiple segments 302. Each of the segments 302 is assigned a unique identifier. The first segment of the message is further identified by a Start Segment, SS, indicator. The last segment of the message is identified by an End Segment, ES, indicator. The segmentation process is defined as segmenting a given message into multiple parts. The multiple segments 302 may have varying lengths. The determination of the length of each of the segments 302 may be based on a channel quality estimate, or other criteria specific to a given communication system. The determination of the length of segments balances efficiency and performance. Shorter segment length incurs a greater total number of segments for the same message. Shorter segment length provides increased reliability and thus enhanced performance. A large total number of segments incur processing and storage overhead that reduce efficiency, e.g., generation of transmission of more segment parameter bits to identify the multiple segments. Ideally a system will optimize performance while maintaining low overhead.

Figure 4A:
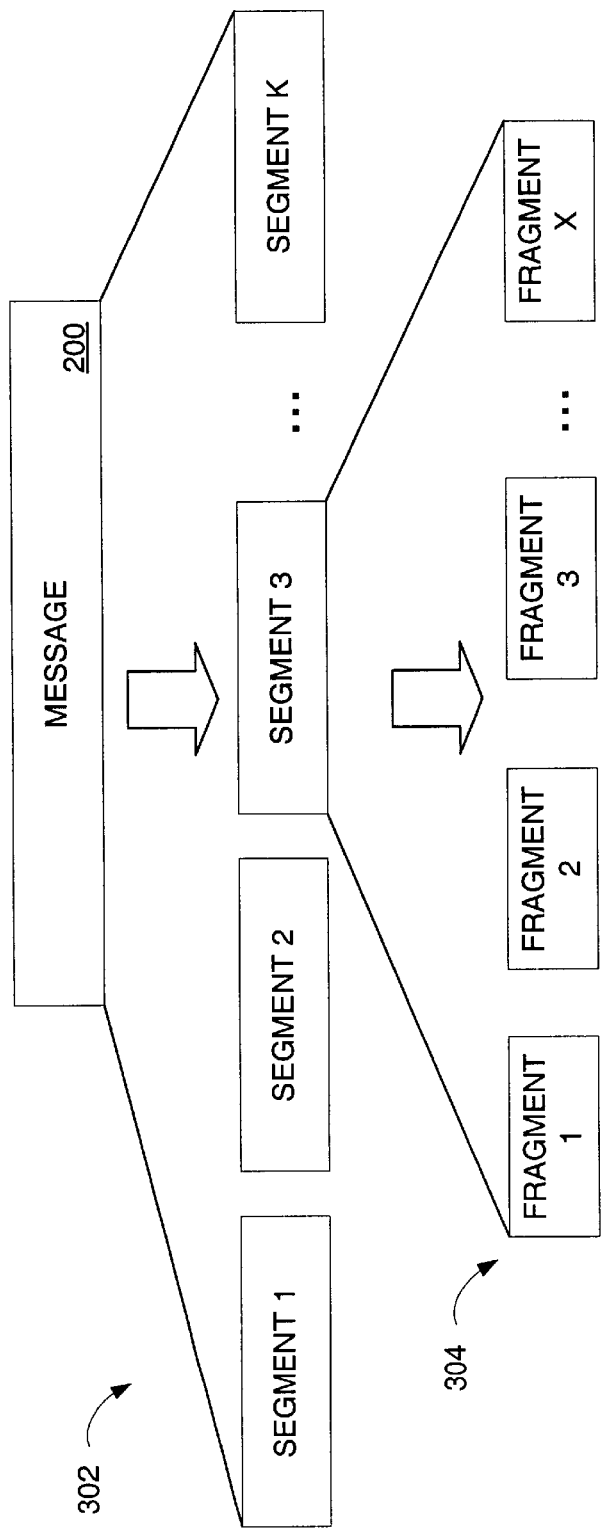
FIG. 4A is a message transmission protocol implementing segmentation applicable in a wireless communication system.

As illustrated in FIG. 4A, message 200 is segmented into K segments. Each of the K segments is then further divided into X fragments. According to the exemplary embodiment, the number of fragments X is variable for each of the segments 302. Alternate embodiments may specify a constant number X of fragments per segment within a given message. The determination of the length of each of the fragments 304 as well as the number of fragments X is determined by parameters of the physical layer 112 and the MAC layer 114. As illustrated in FIG. 4A, SEGMENT 3 of segments 302 is divided into X fragments 304. The fragments 304 are then provided to the MAC layer 114 for transmission via multiple transmission frames (not shown).

As discussed hereinabove, each of the K segments 302 is segmented into X fragments, wherein the total number of fragments n is given as:

$$n=K*X. \quad (2)$$

In the exemplary embodiment, the total number of fragments is equal to the total number of frames generated by the MAC layer 114 for transmission on the physical layer 112, while alternate embodiments may provide the total number of fragments as a function of the total number of frames. The resultant message error rate is defined as a function of the Segment Error Rate, SER, as:

$$MER=1-(1-SER)^K, \quad (3)$$

wherein the SER is defined as:

$$SER=1-(1-FER)^X. \quad (4)$$

Figure 4B:
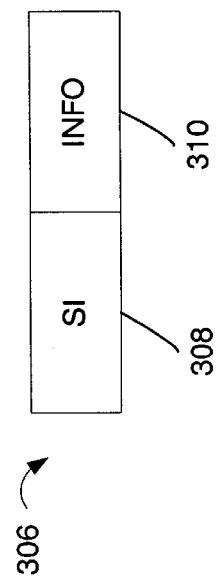
FIG. 4B is a frame configuration according to a transmission protocol such as illustrated in FIG. 4A.

As illustrated in FIG. 4B, each fragment 306 includes a Segment Identifier, SI, 308 and information 310. The information 310 is a portion of the content of a segment from segments 304. According to the exemplary embodiment, the SI includes at least two bits, $SI_1$ and $SI_2$. One of the bits indicates whether segmentation is enabled, and the other of the two bits identifies a first segment of the message.

Figure 5A:
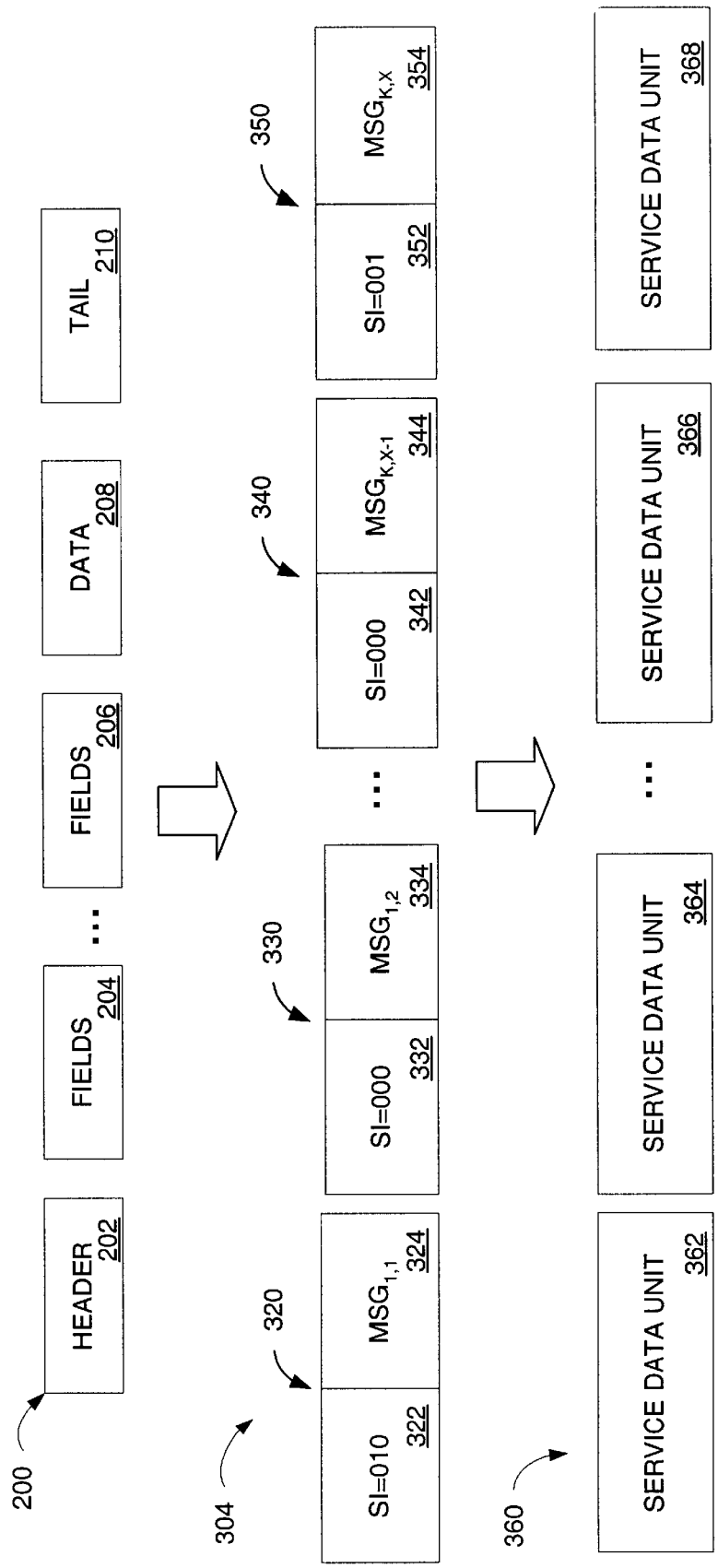
FIG. 5A is an example of a message transmission protocol such as illustrated in FIG. 4A.

In one embodiment of message transmission illustrated in FIG. 5A, a message 200 is divided into X fragments, identified as fragments 304 labeled $MSG_1$ to $MSG_x$. As illustrated, boundaries between fragments 304 are not necessarily the same as boundaries between fields of the message 200, although some segment boundaries may coincide with some field boundaries. The fragments 304 are portions of the information contained in the message 200, including information contained in each of the fields 202, 204, 206, 208, and 210, as well as any other fields included in the message 200.

Each of the X fragments (of fragments 304) corresponds to a transmission frame of frames 360 for a total number of X frames per segment message. Each frame is referred to as containing a Service Data Unit, SDU. Each of the fragments 304 includes a Segment Identifier, SI, value appended as a prefix to a portion of the message 200. The fragment identifier is determined sequentially. Alternate embodiments may implement other methods of assigning identifiers to frames and segments. The identification is used to reconstruct the message at the receiver. Similarly, alternate embodiments may append the SI at the end of the segment information or may integrate the SI information with the segment information. In each of these embodiments, when the organization of the frame is known at the receiver, the receiver is then able to reconstruct the message accordingly.

As illustrated in FIG. 5A, the X fragments 304 include fragments 320, 330, 340, and 350, wherein each fragment 320, 330, 340, and 350 includes a portion of message 200 and an SI. In the embodiment of FIG. 5A, the system supports message segmentation as defined by the protocol of FIG. 4A, however, for the example, transmission message segmentation is inactive. For active segmentation, segment retransmission requests are supported. In other words, the receiver may request a retransmission of a segment or portion of the transmitted message. For inactive segmentation, segment retransmission requests are not supported. The receiver may request retransmission of the entire message, but not a smaller unit thereof.

In the embodiment of FIG. 5A, each SI included three bits. The significance of the SI bits is illustrated in FIGS 5B and 5C. As illustrated in FIG. 5B, the first bit of the SI, labeled $SI_1$, indicated whether segmentation is active or inactive, wherein a high logic value indicates segmentation is active, else segmentation is inactive. The second bit of the SI, labeled $SI_2$, identifies a segment start, wherein a high logic value indicates the start of a segment. The third bit of the SI, labeled $SI_3$, indicates a segment end, wherein a high logic value indicates the end of a segment. The significance of various bit combinations is provided in the table of FIG. 5C. Alternate embodiments may use any number of bits each having a predetermined significance. Additionally, alternate embodiments may implement an alternate polarity scheme for the SI bits.

Continuing with FIG. 5A, the first fragment 320 (of fragments 304) includes a segment identifier portion, SI 322, appended to a message portion $MSG_{1,1}$ 324. The frame 320 is the first fragment in the transmission of message 200, and therefore the SI 322 is designated as 010, wherein $SI_1=0$, $SI_2=1$, and $SI_3=0$. As segmentation is inactive for this example, the second bit, $SI_2$, may be used to identify the start of the message, and the third bit $SI_3$, may be used to identify the end of the message. The next fragment 330 includes SI portion 332 and message portion $MSG_{1,2}$ 334. The SI 332 indicates a middle transmission fragment. As last fragment 350 includes SI portion 352 and information portions 354. The SI 352 indicates an end of segment, or message.

Each of the fragments 304 corresponds to an SDU 360 generated by the MAC layer 114. Specifically, as illustrated, fragment 320 corresponds to SDU 362, fragment 330 corresponds to SDU 364, fragment 340 corresponds to SDU 366, and fragment 350 corresponds to SDU 368. The SDUs 360 corresponds to transmission frames sent over the physical layer 112.

Continuing with FIG. 5A, SI 322 indicates segmentation inactive for this transmission. Even though segmentation is inactive, the message 200 is divided to form fragments 304 resulting in SDUs 360. SDUs 360 are modulated and transmitted. In one embodiment, an error checking mechanism is also applied to the SDUs 360. As the frames are received at the receiver, the error checking is evaluated to find frame errors. On detection of a frame error, the receiver is not able to request a particular segment for retransmission as segmentation is inactive. Instead the receiver will request retransmission of the entire message 200. As discussed hereinbelow, and particularly with respect to FIGS. 8 and 9, when segmentation is active, the receiver is provided sufficient information to request the segment in which a frame error was detected. In this way, bandwidth is conserved and transaction time is reduced.

FIGS. 5D and 5E illustrate an alternate embodiment, wherein the SI includes two bits. The first bit, $SI_1$, indicates whether segmentation is active. The second bit, $SI_2$, identifies the start of a segment. The significance of combinations of the two bits is provided in the table of FIG. 5E.

Figure 6:
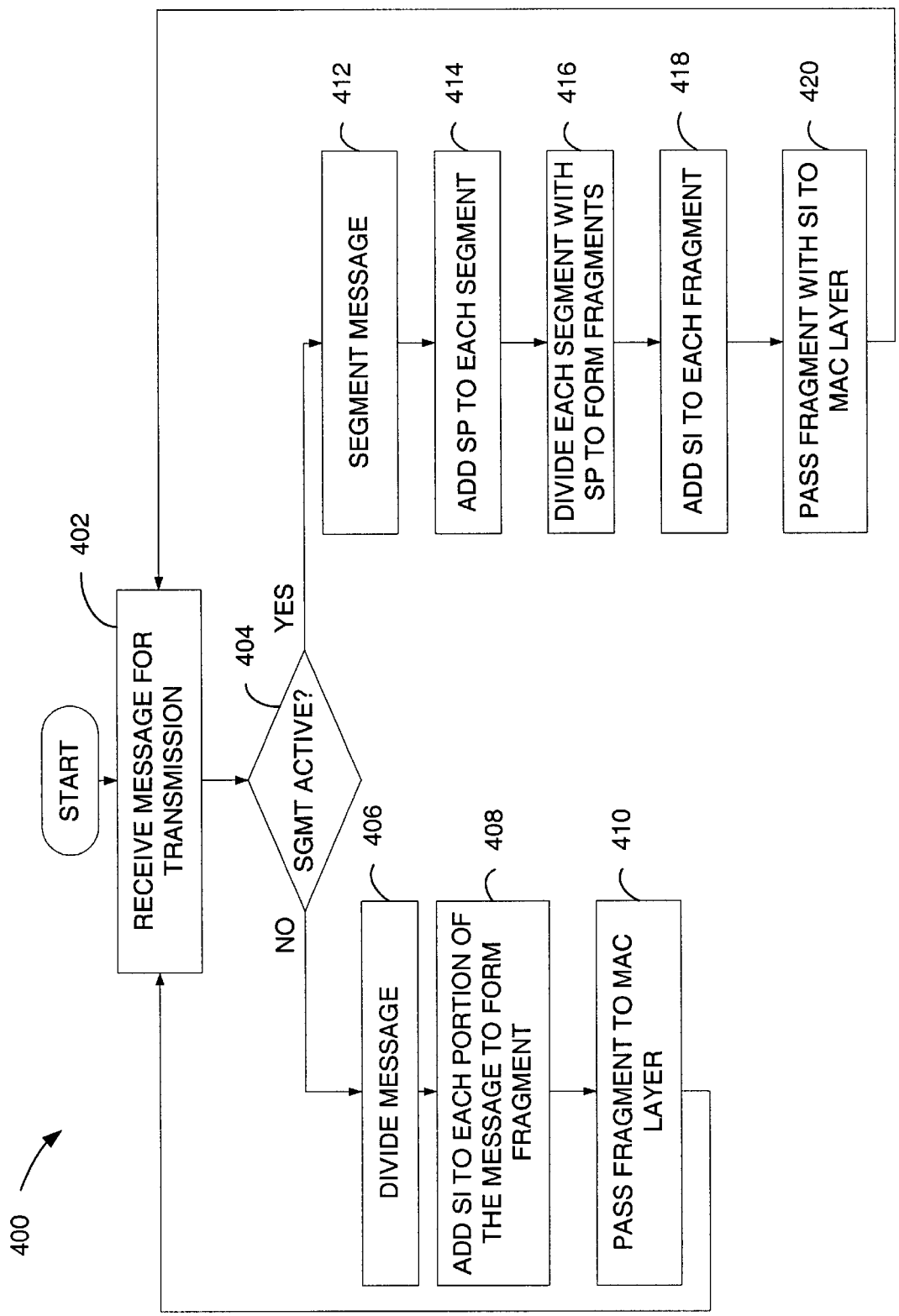
FIG. 6 is a flow diagram of a method of message segmentation for transmission.

FIG. 6 illustrates a method 400 of message segmentation applied at a transmitter in a wireless communication system according to one embodiment. The transmitter receives a message for transmission at step 402. The message may be a control message or other short duration message for transmission to a target receiver. If segmentation is active at decision diamond 404, processing continues to step 412 to segment the message into K segments. The transmitter determines an appropriate Segment Parameter, SP, to add to each segment and generates the SP at step 414. The structures formed in step 414 are divided to form X fragments at step 416. The transmitter determines the appropriate SI to apply to each fragment. The SI is then appended to each fragment at step 418. Each fragment, including SI, is passed to the MAC layer for processing at step 420. Processing then returns to step 402 to process the next message.

Returning to decision diamond 404, if message segmentation is inactive, processing continues to step 406 to divide the message into X portions. An SI is appended to each message portion to form a fragment at step 408. The fragments are then passed to the MAC layer at step 410. Processing returns to step 402 to process a next message.

Figure 7A:
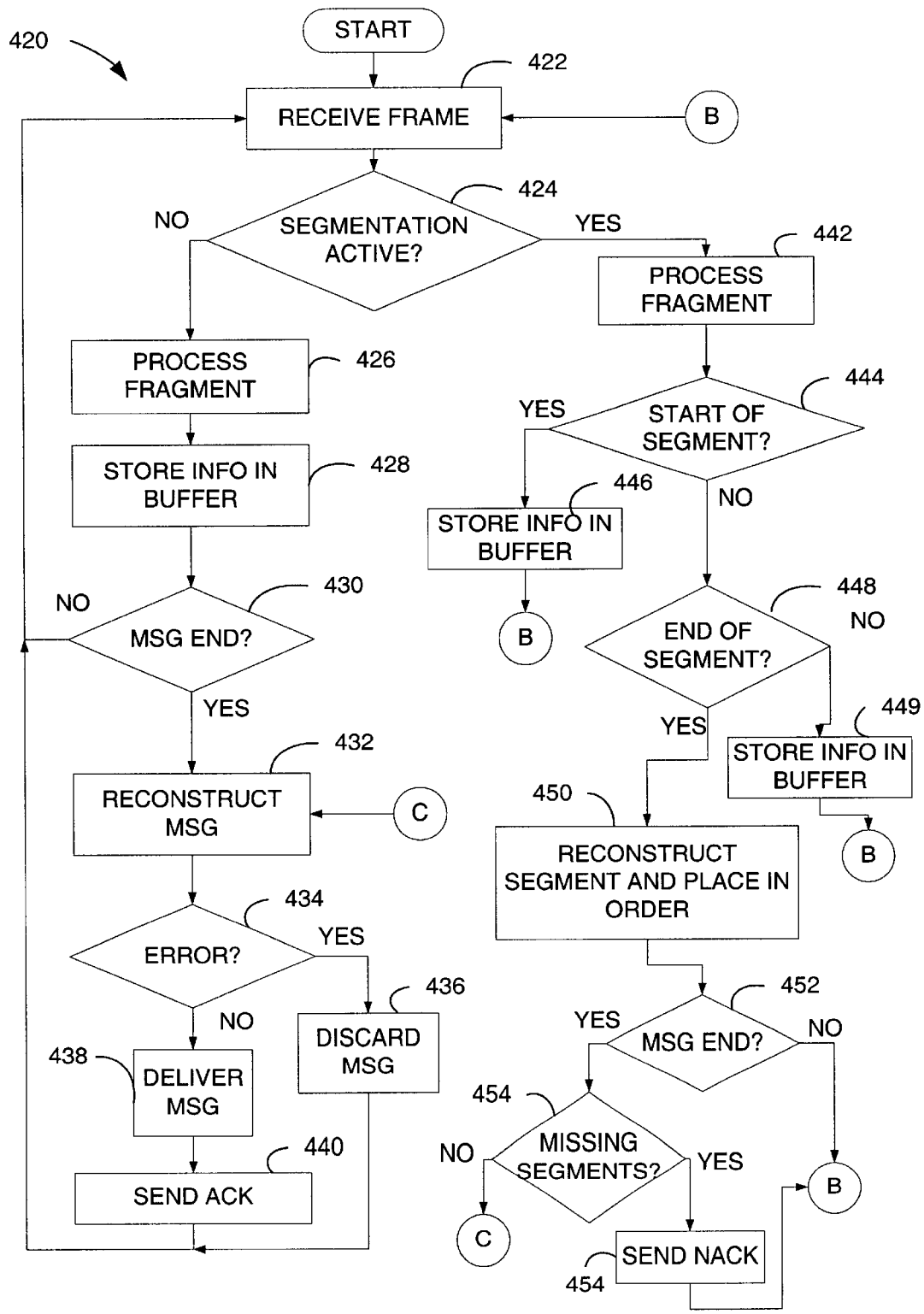
FIG. 7A and FIG. 7B are flow diagrams of a method of receiving a segmented message.
Figure 7B:
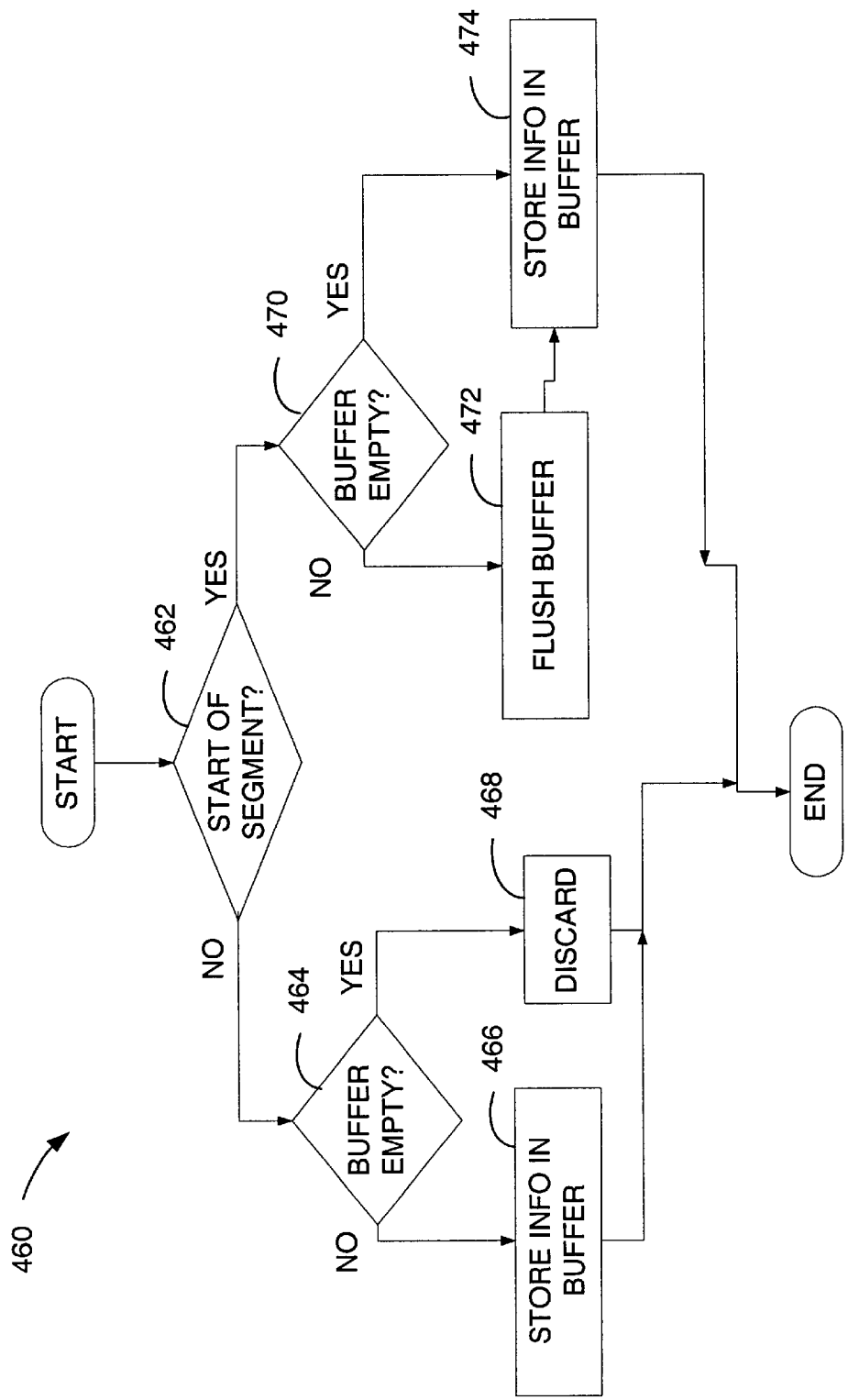

At the receiver, the SI bits are extracted from the received fragment to determine processing of a transmitted message. FIGS. 7A and 7B illustrate a method 420 of processing a transmitted segmented message at the receiver. The receiver receives a transmitted frame at step 422. The receiver determines if segmentation is active by evaluating the SI bits included in the frame. If segmentation is active processing continues to step 442 to process the fragment contained in the frame. Processing of the fragment is further detailed in FIG. 7B. The process then determines from the SI bits if the frame is a start of segment at decision diamond 444. If the frame is a start of segment, the receiver stores the information portion of the fragment in a memory storage buffer at step 446. Processing then returns to step 422 to receive a next frame.

Returning to decision diamond 444, if the received frame is not a start of segment, the receiver determines if the frame is an end of segment based on the SI bits at decision diamond 448. If the received frame is not an end of segment, the receiver stores the information from the fragment into the buffer and processing returns to step 422. If the frame is the end of a segment, the receiver reconstructs the segment and places the segment in order at step 450. If this segment completes a message at decision diamond 452, the receiver checks for missing segments at decision diamond 454. If there are no missing segments processing continues to step 432 to reconstruct the message. If missing segments are determined at decision diamond 454, the receiver sends a Negative Acknowledge, NACK, message at step 454 and processing returns to step 422. If the segment is not the end of the message at decision diamond 452, processing returns to step 422.

If segmentation is not active at decision diamond 424, processing continues to step 426 to process the fragment. Processing of the fragment is further detailed in FIG. 7B. The receiver then stores the information contained in the fragment into a memory storage buffer at step 428. The receiver determines if the frame marks the end of a message at decision diamond 430. If the receiver does not detect a message end, processing returns to step 422 to process a next frame. If the receiver detects a message end the message is reconstructed at step 432. The receiver then checks for errors in the message at decision diamond 434. On detection of an error, the receiver discards the message at step 436 and processing returns to step 422. If no error is detected in the message, the receiver delivers the message at step 438 to the corresponding application or service. The receiver sends an ACK message at step 440 and processing returns to step 422.

A portion of the processing of a fragment, as contained in a frame, is further detailed in FIG. 7B. The method 460 illustrates processing of a fragment in a wireless communication system supporting message segmentation. If the fragment is a start of segment, the receiver determines if the storage buffer is empty at step 470. If the buffer is not empty the method 460 flushes the buffer and stores the information from the received frame in the buffer at step 474. If the buffer is empty, the process stores the information in the buffer at step 474. If the fragment is not a start of segment, the receiver checks the status of the buffer at decision diamond 464. If the buffer is empty the receiver discards the received frame at step 468. For example, if the start of segment fragment is lost, the receiver will not process the remainder of the segment. If the buffer is not empty the information from the frame is stored in the buffer at step 466.

Figure 8:
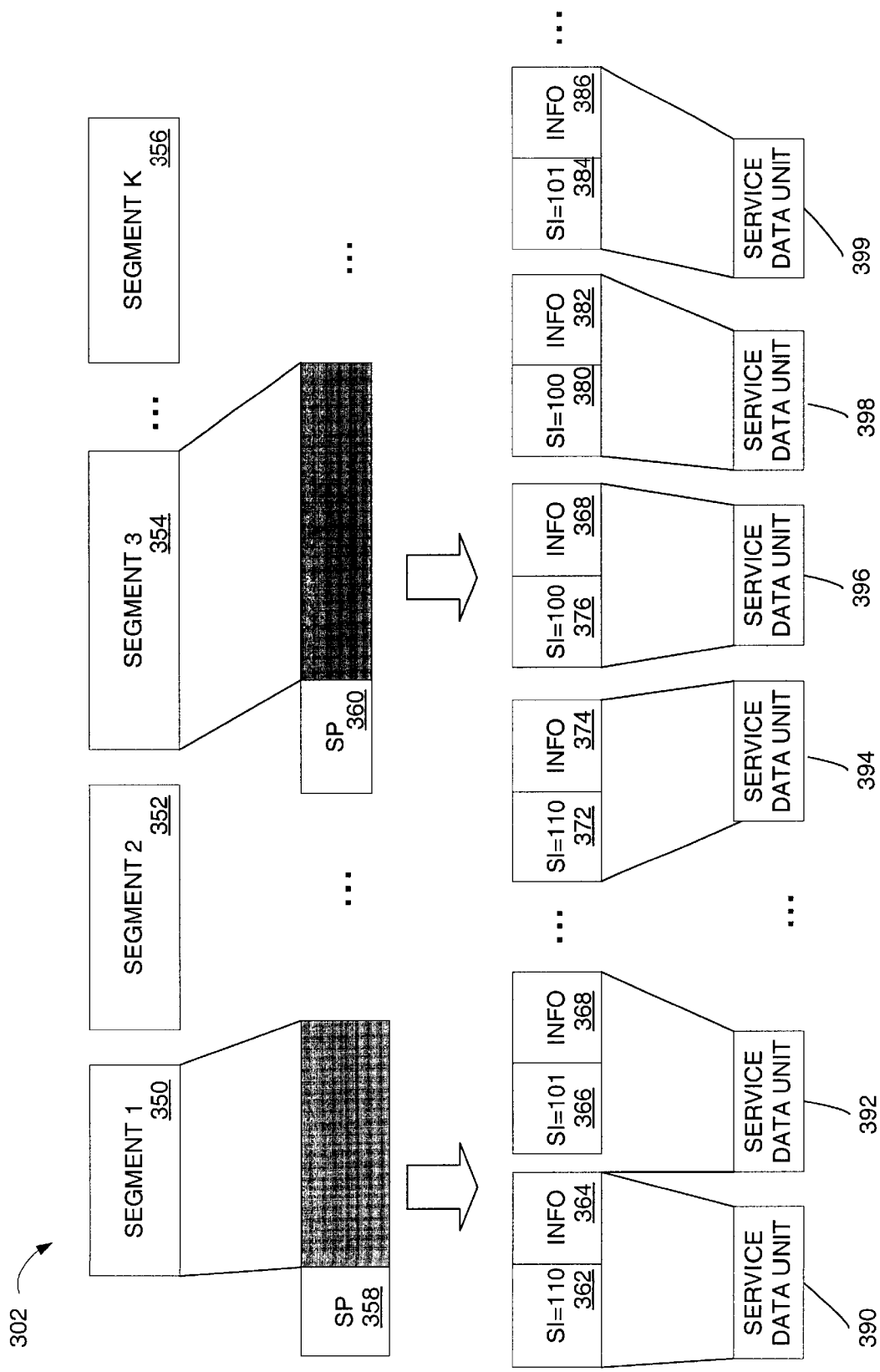
FIG. 8 is an example of message segmentation for transmission.

In one embodiment of message transmission illustrated in FIG. 8, a message 200 is segmented consistent with the method 400 of FIG. 6. Message segmentation is active in processing of the message 200 as illustrated in FIG. 8. The message 200 is segmented into segments 302. Each of the segments 302 includes a portion of the message 200. Each of the segments 302 has a sequential identifier. To each segment 350, 352, 354, . . . , 356 a Segment Parameter, SP, is added. The combination of segment plus SP is further divided to form fragments. The fragments are then modified to include an SI, wherein in the present embodiment the SI includes three bits and has significance as specified in FIGS. 5B and 5C. Each fragment is then used to generate an SDU.

Message segmentation allows retransmission of a portion of the message avoiding the time delays and resource allocation required by full retransmission of the entire message. A comparison of a method of message transmission without segmentation and a method of message transmission with segmentation is provided in FIGS. 9A and 9B.

Figure 9A:
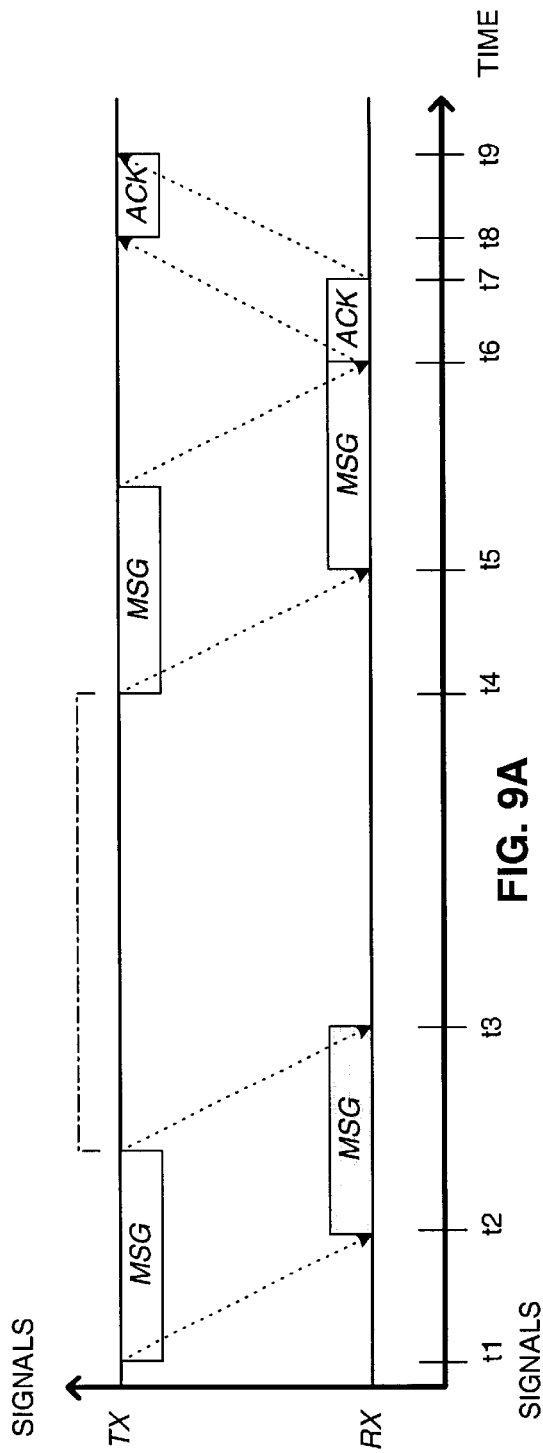
FIG. 9A is a timing diagram of a message transmission with retransmission of the message.

FIG. 9A illustrates a message transmission without segmentation, wherein message retransmission is requested and completed. The transmitter, designated as Tx, sends the message from time t1. The receiver, designated as Rx, begins receiving the message at time t2 and the message is completed at time t3. The transmitter then waits for an ACK message from the receiver. The receiver is not able to process the received message and therefore no ACK is sent. At time t4 the transmitter retransmits the message. The receiver receives the retransmitted message at time t5. The entire message is received at time t6 and sends an ACK message at time t6. The transmitter receives the ACK message from time t8 to t9. At time t9 the message transmission and retransmissions are complete.

Figure 9B:
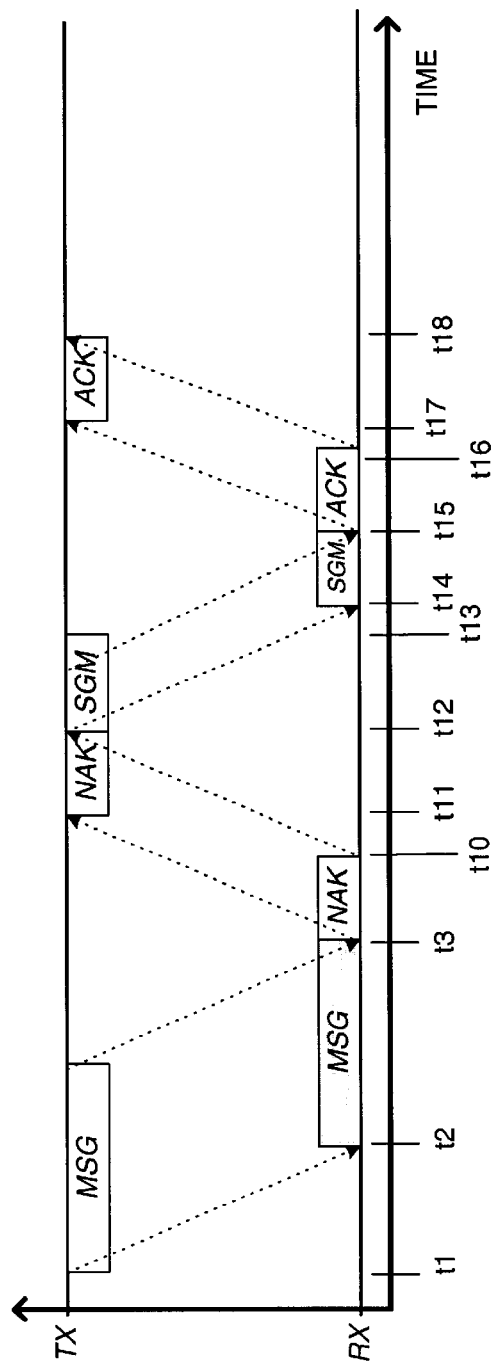
FIG. 9B is a timing diagram of a message segmentation and transmission with retransmission of at least one segment.

In comparison to FIG. 9A, FIG. 9B illustrates a message transmission with segmentation, wherein a segment retransmission is requested and completed. The transmitter transmits the message from time t1, and the receiver receives the message from time t2 to t3. A NAK message is sent from time t3 to t4, wherein the NAK identifies the missing segment of the transmitted message. The transmitter receives the NAK at time t11 and retransmits the segment, designated as SGM, at time t12. At time t14 the receiver receives the retransmitted segment, and sends an ACK at time t15. The transmitter receives the ACK from time t17 to t18. The retransmission of a segment or portion of a message reduces the latency of the entire message transmission and frees up transmitter resources for other transmissions. As illustrated, the segmented message transmission provides a reduction in the total transaction time.

Figure 10:
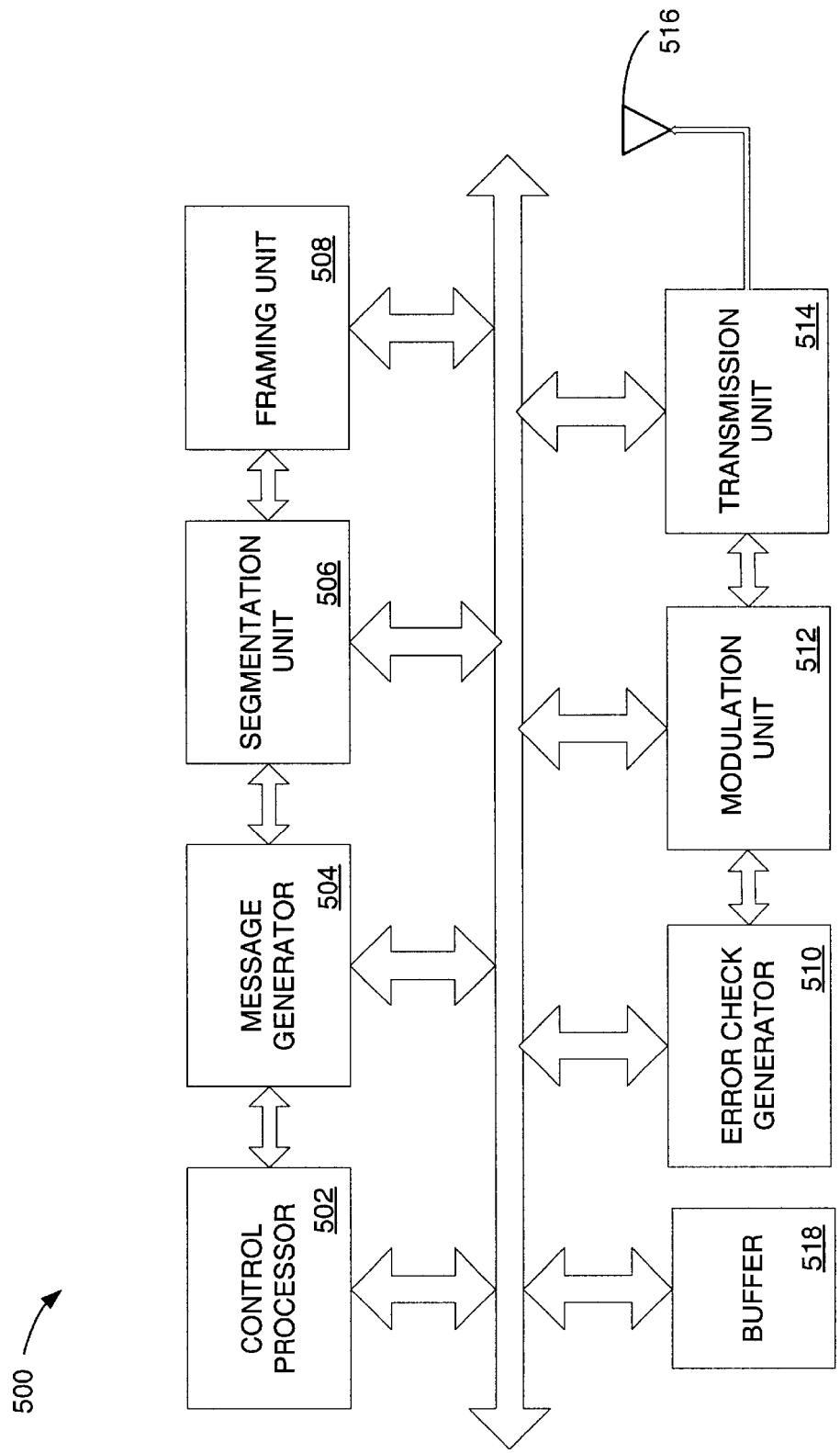
FIG. 10 is a block diagram of a transmitter supporting a message segmentation and transmission protocol.

A transmitter 500 is illustrated in FIG. 10 supporting segmented message transmission. A control processor 502 is coupled to a communication bus. The control processor 502 controls operation of a message generator 504. The message generator 504 provides a control and/or signaling message, or other short duration message, for transmission to a segmentation unit 506. When segmentation is active, the segmentation unit segments the message and adds a segment parameter to each segment. The segmentation unit 506 further divides each of combination of SP and segment into fragments. The segmentation unit 506 determines a Segment Identifier, SI, applicable to each segment. The fragments are then modified to include the appropriate SI. The segmentation unit 506 provides the multiple modified fragments to a framing unit 508 where transmission frames are prepared. An error check generator 510 applies an error checking mechanism to the transmission frames. The transmitter 500 further includes a modulation unit 512 and a transmission unit 514 coupled to an antenna 516. The transmitter 500 further includes a buffer 518 for storing the message or portions of a message in preparation for transmission.

Figure 11:
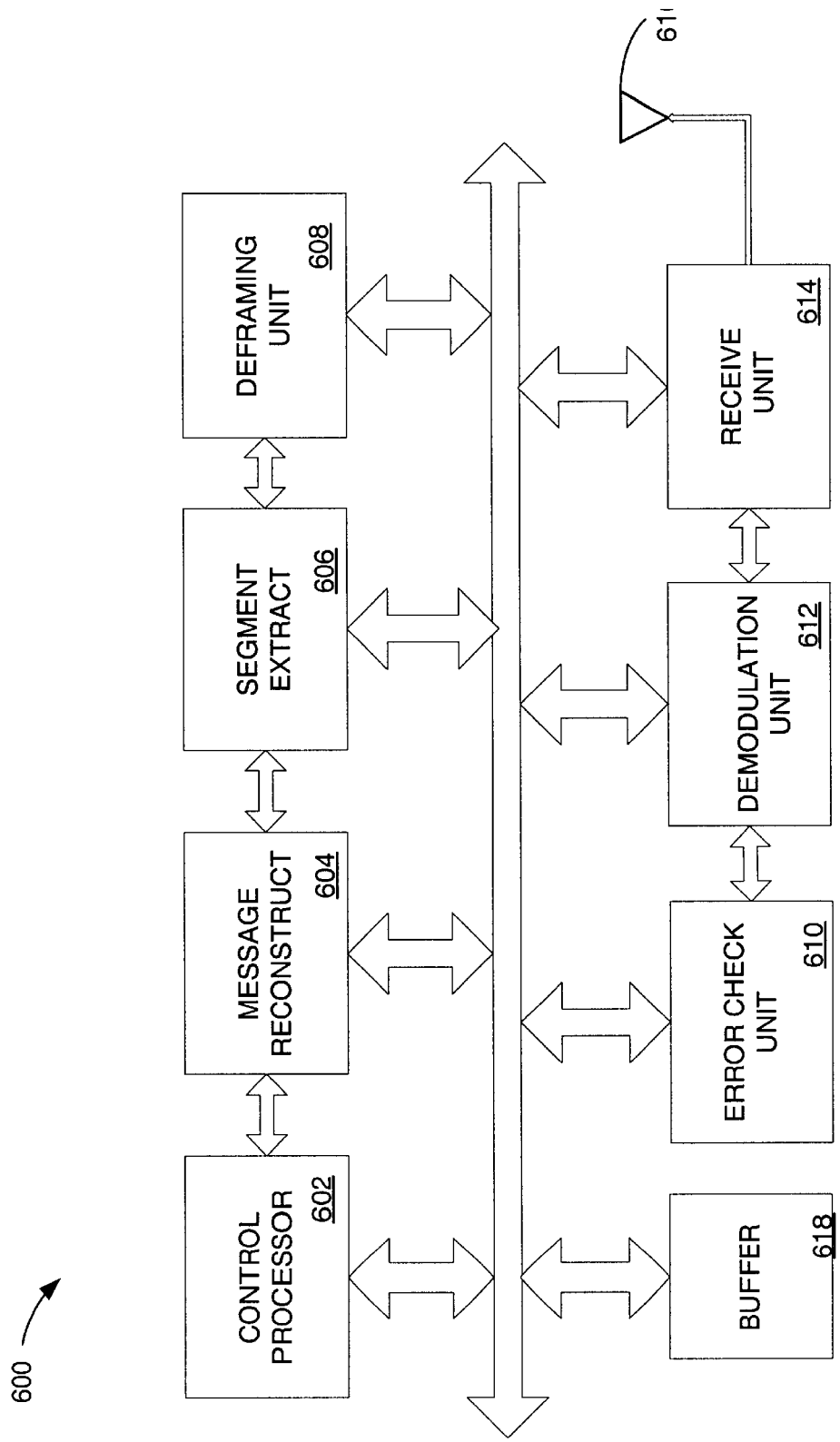
FIG. 11 is a block diagram of a receiver supporting a message segmentation and transmission protocol.

A receiver 600 is illustrated in FIG. 11 supporting segmented message transmission. The receiver 600 includes a control processor 602 coupled to a communication bus. Frames are received at antenna 616 and processed by receive unit 614. A demodulation unit 612 demodulates the received frames and error check unit 610 checks for transmission errors. A deframing unit 608 extracts the individual fragments from the received frames. Segment extract unit 606 determines the segments of each fragment and determines the ordering of the segments based on the SI and SP information. The message is reconstructed by placing the segments in order in the message reconstruct unit 604. If the received message has no missing segments, the message is then passed to higher layer applications in the receiver 600. If the received message has a missing segment(s), the receiver 600 requests retransmission of the missing segment (s).

Figure 12:
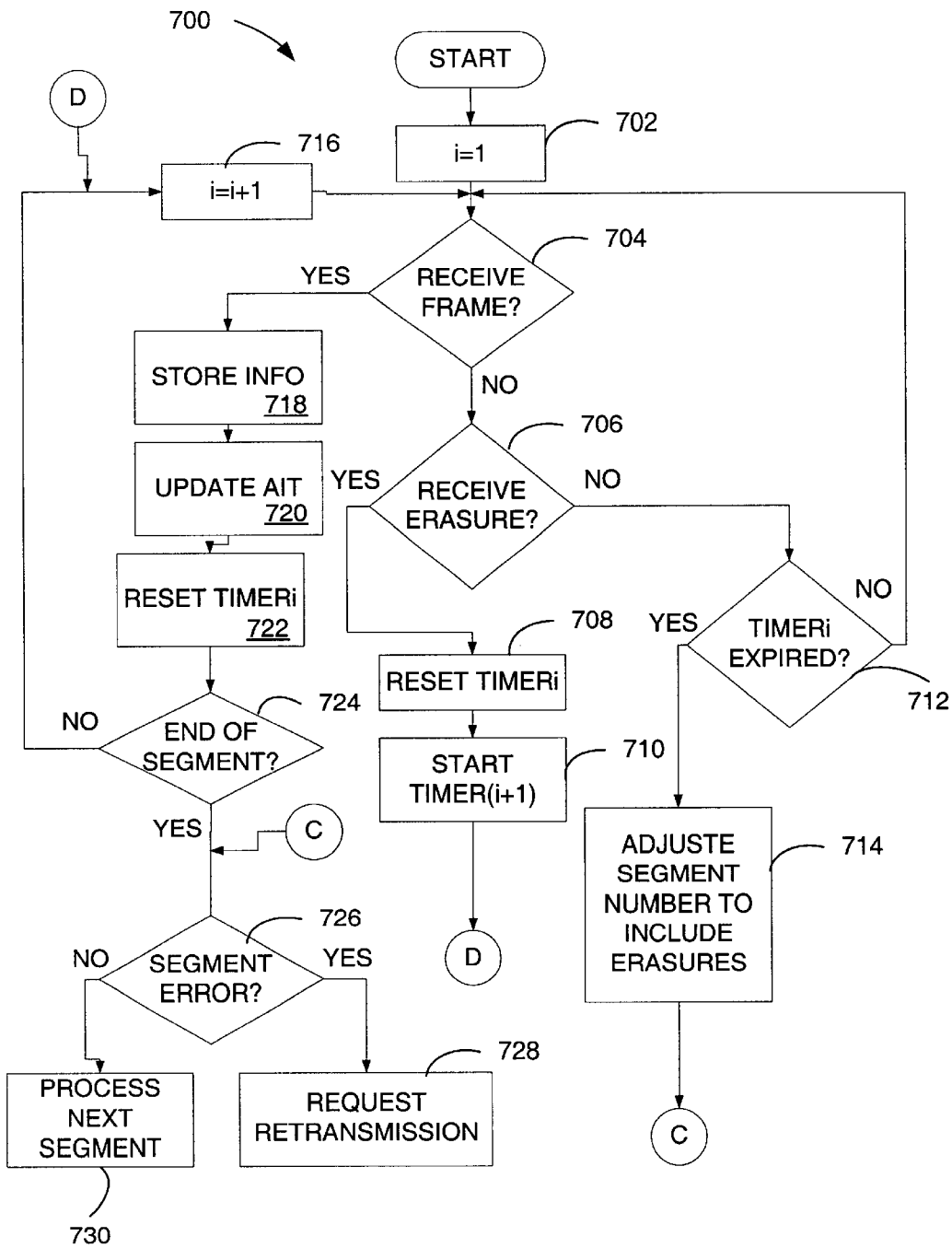
FIG. 12 is a flow diagram of a process for identifying a missing end of a segment fragment for a frame.

In one embodiment, a receiver method as in FIGS. 7A and 7B, further determines if an end of segment fragment is lost. FIG. 12 illustrates a method 700 of identifying a missing end of segment fragment or frame. The method 700 initializes an index at step 702. If a first erasure is detected at the receiver, the receiver starts a timer. The timer is scheduled for a time period defined as:

$$\text{Timer } i = \alpha * AIT \tag{5}$$

wherein $\alpha$ is a constant value, and AIT is the average inter-arrival time of frames. The timer i continues to count until a message or erasure is received. If the timer i expires before a frame or erasure is received, the receiver considers the first erasure as an end of segment. If prior to expiration of the timer i a second erasure is received, the receiver resets the timer i and starts a timer i+1. The timer i+1 is defined by the time period:

$$\text{Timer } i+1 = \beta * (\text{timer } I) + \gamma * (t2 - t1) \tag{6}$$

wherein $\beta$ and $\gamma$ are constant values. Any number of additional timers may be used, each having a similar time assignment. Alternate embodiments may employ a variety of time periods and ways of implementing the timer. Effectively, each erasure initiates a timer. The number of erasures is then used to determine the length of the segment.

When any timer expires without receipt of a frame or an erasure, the receiver identifies the end of segment as the last received erasure.

Continuing with method 700 of FIG. 12, if a frame is received at decision diamond 704, the information from the frame is stored in a memory storage buffer at step 718. The receiver updates an average inter-arrival time of segments referred to as AIT at step 720. At step 722 the receiver resets a timer i. At decision diamond 724, if the frame was the end of a segment, processing continues to step 726 to check for errors. If no segment errors are found the segment is processed as part of the message at step 730. If an error is found, the receiver requests a retransmission at step 728. If the frame was not the end of a segment at decision diamond 724, the index value i is incremented at step 716 and processing continues to decision diamond 704 to wait for a next frame. If no frame is received at decision diamond 704, the receiver checks for an erasure at step 706. An erasure is a message received that the receiver cannot process, such as due to a transmission error. If an erasure is received, the timer i is reset 708 and a second timer i+1 is started 710. Processing then continues to step 716 to increment the index. If no erasure is found at decision diamond 706 the receiver checks for errors at decision diamond 712. If the timer i has not expired at decision diamond 712 processing returns to decision diamond 704 to wait for a next frame. If the timer has expired, the ordering of segments reflects the cumulative erasures at step 714.

FIGS. 13A and 13B provide examples at a receiver. In FIG. 13A, a first frame is received at time t1 and a second frame at time t2. The first and second frames are processed by the receiver and contained no errors. When the third frame is expected, an erasure is received at time t3. The occurrence of the erasure triggers the start of a first timer. The time period for expiration of the timer is defined by the average interval between frames. A fourth frame is received at time t4 prior to expiration of the timer. The timer is reset at time t4.

In the example of FIG. 13B, the first two frames are received and the next two frames are not. An erasure is received at time t3, and a first timer is started in response. A second erasure is received at time t4 prior to expiration of the first timer. The first timer is reset, and a second timer is started at time t4, wherein the timer period for expiration of the second timer is a function of the first timer value. Again, when any timer expires, the receiver is able to identify the last received erasure as an end of segment. Calculation of the number of erasures allows the receiver to calculate the number of frames per segment.

According to one embodiment, a method of using multiple timers to identify an end of segment or end of message (such as illustrated in FIG. 12) is applicable to an Asynchronous Transport Method, ATM, wherein the ATM protocol defines a start of message and an end of message. The timers described hereinabove with details provided in equations (5) and (6), identify an end of message and any intervening missing segments and/or fragments, thus avoiding the loss of an end of message in a transmission.

According to an alternate embodiment, a method of using multiple timers to identify an end of segment or end of message (such as illustrated in FIG. 12) is applicable to a Transport Communication Protocol, TCP, wherein the TCP protocol defines an end of message as a FIN field. The timers described hereinabove with details provided in equations (5) and (6), identify an end of message and any intervening missing segments and/or fragments, thus avoiding the loss of an end of message in a transmission. Alternate embodiments may apply implementation of a timing mechanism to determine missing portions of a transmission, wherein multiple timing mechanisms may be implemented.

As disclosed hereinabove, a method for segmented message transmission is provided. Each message is first segmented and then the segments are fragmented. A segment parameter is applied to each segment, and a segment identifier to each fragment. The fragments are provided to a lower level for preparation into frames for transmission. The exemplary embodiment may be applied to the transmission of short duration messages, such as control messages, etc.

Figure 14:
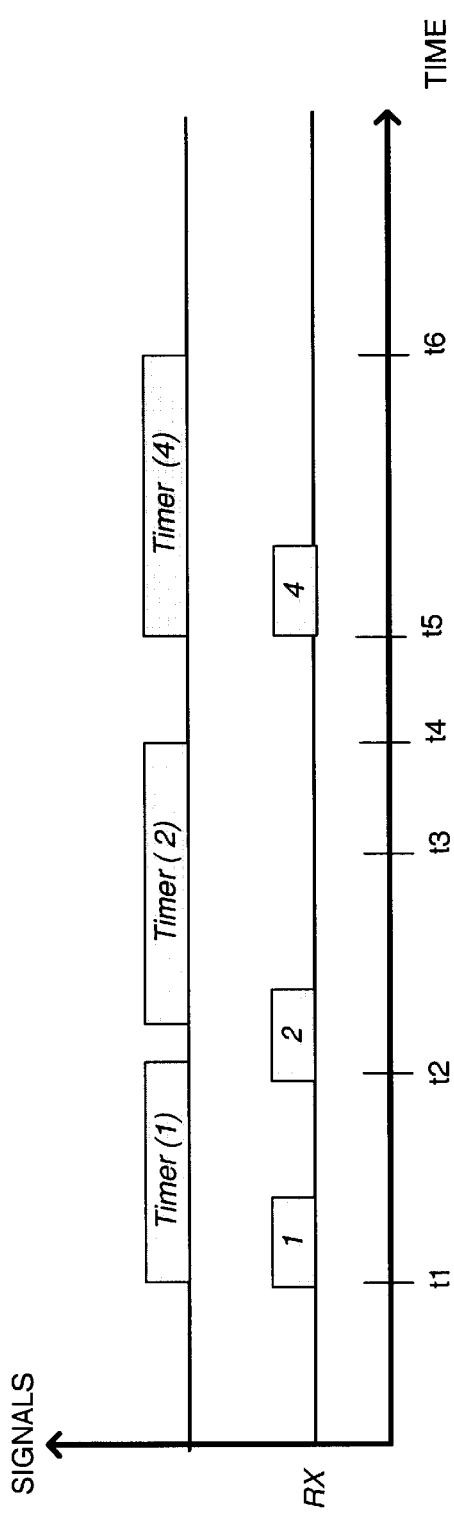
FIG. 14 is a timing diagram illustrating the use of timers in analyzing frames.

In an alternate embodiment, illustrated in FIG. 14, a timer is initialized each time a frame is received. In other words, the trigger event is the receipt of a frame. As illustrated in the timing diagram of FIG. 14, a first frame FRAME (1) is received at time t1. In response to receipt of FRAME (1), a first timer is started or reset, TIMER (1), wherein the index in parenthesis corresponds to the sequential number of the frame within a given segment. Note that according to one embodiment, the first frame FRAME (1) within a segment includes a start of segment indication. The TIMER (1) has a first expiration period, which may be a predetermined value, or may be a function of the length in time of FRAME (1). At time t2 a second frame FRAME (2) is received and thus stops TIMER (1). If FRAME (2) had not been received within the first expiration period, FRAME (2) would be considered a lost frame. The expiration period of each timer used for receipt of a given segment is designed to allow time for a late arriving frame, but to identify those frames that are lost.

In response to receipt of FRAME (2), a second timer TIMER (2) is initiated. The TIMER (2) has a second expiration period. The second expiration period may be a predetermined value, such as wherein all timers use an assigned value, or may be a function of the previous timer expiration periods. In one embodiment, each successive timer within a segment has an expiration period that is calculated dynamically as a function of at least one previous timer. In this way, an average value or a projected value may be used to predict the length of a next frame in a series and also may consider any delay times experienced between frames. In this case, while a third frame is anticipated at time t3, no frame is received within the second expiration period. The system treats the expiration of the second timer as an indication that the FRAME (3) is lost.

Continuing with the transmission, a fourth frame FRAME (4) is received at time t4, and in response a fourth timer TIMER (4) is started. The TIMER (4) having an expiration period calculated as described hereinabove with respect to TIMER (2). In this case, a fifth frame FRAME (5) is anticipated before time t6, but fails to arrive. Note that the frame may arrive but be received as unreadable, such as wherein any control or status information is in error and therefore the receiver is unable to decipher the received bits. At time t6 the TIMER (4) expires and thus the FRAME (5) is considered a lost frame. (you can add the clarification that the receiver know that a "FRAME (5)" has to exist since, up to 4, it has not received yet a frame which carries the "end" indication)

Figure 15:
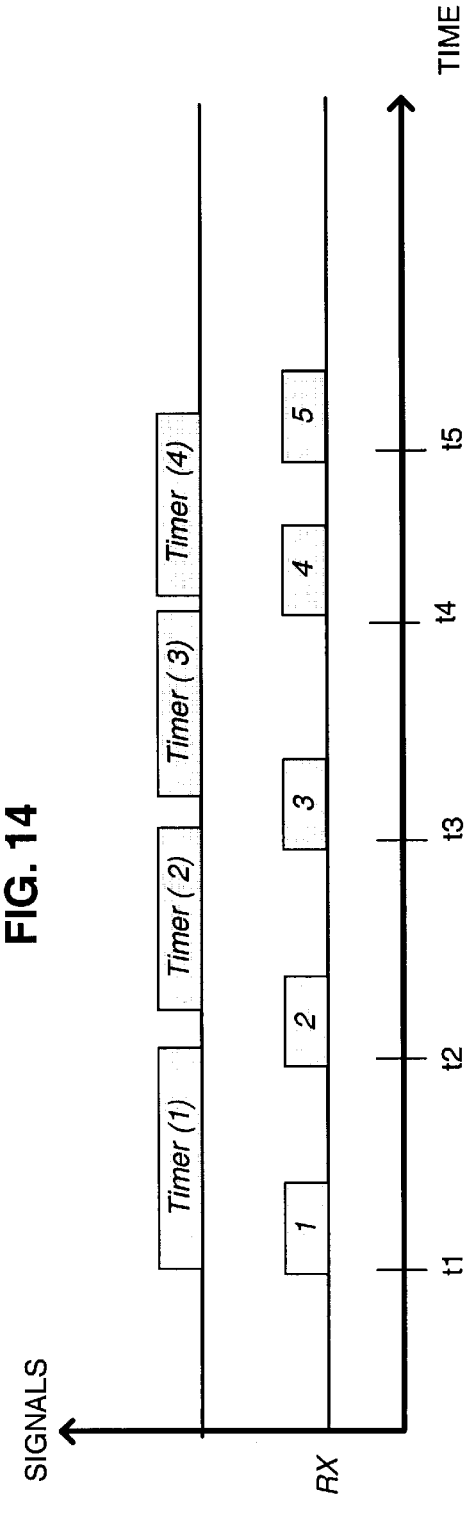
FIG. 15 is a timing diagram illustrating the use of timers in analyzing frames.

FIG. 15 illustrates one embodiment using individual timers triggered on receipt of each frame in a segment, wherein receipt of FRAME (5) does not initiate a timer. In this case, FRAME (5) includes an indication of the end of the segment. The timers TIMER (1), TIMER (2), TIMER (3), TIMER (4), are triggered on receipt FRAME (1), FRAME (2), FRAME (3), FRAME (4), respectively. As FRAME (5) is the final frame in the segment a timer is not used.

Figure 16:
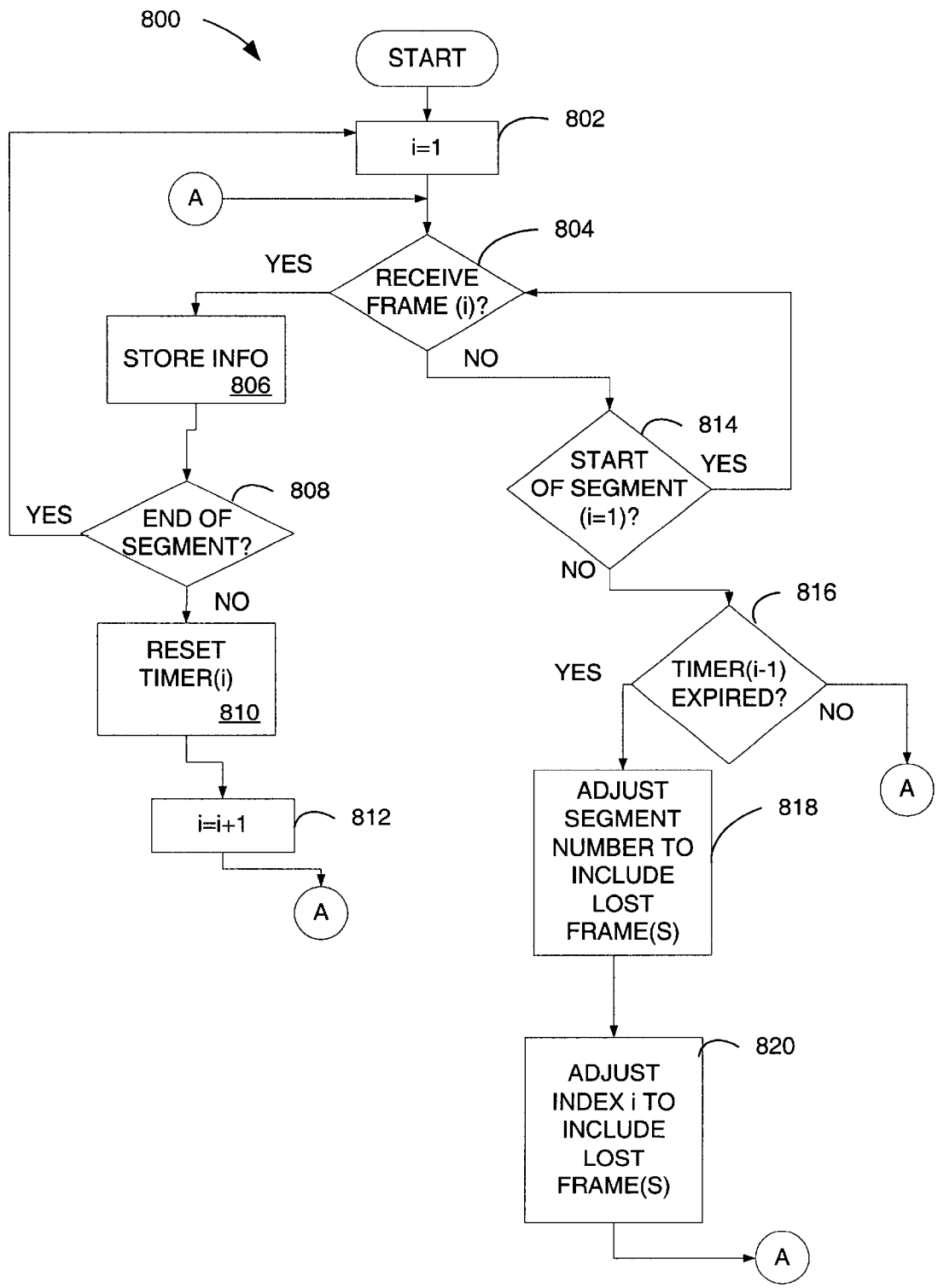
FIG. 16 is a flow diagram of a method of implementing individual frame timers.

FIG. 16 illustrates a method 800 of implementing individual frame timers according to one embodiment. At step 802 an index i corresponding to the sequential frame number within a segment of transmitted information is initialized. Decision diamond 804 determines if FRAME (i) has been received. When no frame is received, processing continues to decision diamond 814 to determine if the FRAME (i) is a start of segment frame, i.e., i=1. For a start of segment frame processing continues to decision diamond 816, else processing returns to decision diamond 804 to await a first frame in a segment. Decision diamond 816 determines if the timer TIMER (i−1) for the FRAME (i−1) has expired. The TIMER (i−1) was started on receipt of a previous frame and has an expiration period. If The TIMER (i−1) is expired, the FRAME (i) is considered lost; the segment number is adjusted to include lost frame(s) at step 818; and the index i is adjusted to include the lost frame(s). Note that the expiration period may be designed to identify multiple lost frames 820. Processing then returns to decision diamond 804 to await a next frame.

Continuing with FIG. 16, if the FRAME (i) is received at decision diamond 804, processing continues to step 806 to store the information contained in the frame. At decision diamond 808 if an end of segment identifier is contained in FRAME (i), the processing returns to step 802 to initialize the index i. If the FRAME (i) is not an end of segment frame, processing continues to step 810 to reset the TIMER (i). The timer is reset at step 810 to await the next anticipated frame. The index I is incremented at step 812 and processing returns to decision diamond 804 to await a next frame.

Figure 17:
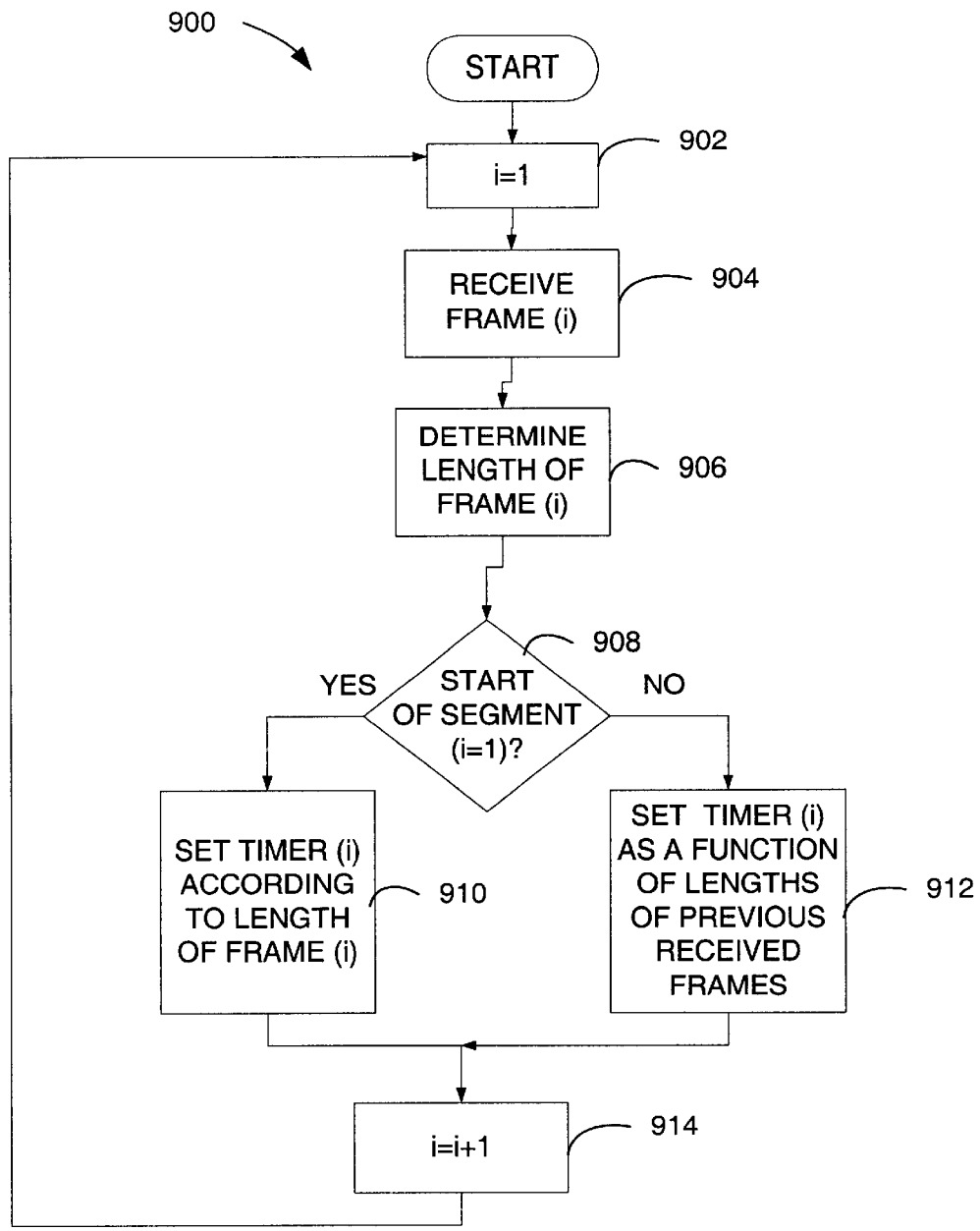
FIG. 17 is a flow diagram of a method of dynamic calculation of expiration period(s) for individual frame timers(s).

Dynamic calculation of expiration periods for the timers according to one embodiment is illustrated in FIG. 17. The index i is initialized at step 902. A FRAME(i) is received at step 904. The length of FRAME(i) is determined at step 906. If the FRAME(i) is a start of segment frame, as determined at decision diamond 908, the TIMER (i) is set according to the length of FRAME(i) at step 910. Else, the TIMER (i) is set as a function of the lengths of previous received frames at step 912. The index i is incremented at step 914 and processing returns to step 902. The dynamic determination of expiration periods may calculate an average or the mean of previous frame lengths. Similarly, the determination may be a projected or anticipated time period based on previous performance of the system during the current segment, or based on historical information relating the probability of receiving a given frame within a predetermined time period. The calculation may consider delays in receiving previous frames.

Thus a variety of methods have been illustrated hereinabove for transmitting segmented messages in a wireless system. Each method finds application according to the design and resource requirements of a given system. While the various embodiments have been described with reference to a CDMA type spread spectrum communication system, the concepts are applicable to alternate spread spectrum type systems, as well as other type communication systems. The methods and algorithms presented hereinabove may be implemented in hardware, software, firmware, or a combination thereof. For example, using the MMSE approach to a non-time gated pilot, the equations for solving for the combiner weights may be performed in software or using a Digital Signal Processor, DSP, to perform the calculations. Similarly, the adaptive algorithms may be implemented in software in the form of computer readable instructions stored on a computer readable medium. A Central Processing Unit, such as a DSP core, operates to perform the instructions and provide signal estimates in response. Alternate embodiments may implement hardware, such as an Application Specific Integrated Circuit, ASIC, where feasible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be an integral part of the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system having a base station controller and a plurality of base stations, each of the plurality of base stations adapted for communication with a plurality of mobile stations, a method comprising:

receiving a first frame in a plurality of transmission frames, each of the plurality of transmission frames having an identifier;

initiating a first timer set to a first expiration period, wherein the first expiration period is determined by an average inter-arrival time period between transmitted frames, and if a second frame is not received prior to the expiration of the first expiration period, determining the identification and expected arrival time of a next frame, if a second frame is received prior to the expiration of the first expiration period, terminating the first timer, and initiating a second timer set to a second expiration period on receipt of the second frame.

2. In a wireless communication system having a base station controller and a plurality of base stations, each of the plurality of base stations adapted for communication with a plurality of mobile stations, a method comprising:

receiving a first frame in a plurality of transmission frames, each of the plurality of transmission frames having an identifier;

initiating a first timer set to a first expiration period, wherein the first expiration period is given as:

First expiration period=$\alpha$*AIT, and if a second frame is not received prior to the expiration of the first expiration period, determining the identification and expected arrival time of a next frame, if a second frame is received prior to the expiration of the first timer expiration period, terminating the first timer, and initiating a second timer set to a second expiration period on receipt of the second frame.

3. In a wireless communication system having a base station controller and a plurality of base stations, each of the plurality of base stations adapted for communication with a plurality of mobile stations, a method comprising:

receiving a first frame in a plurality of transmission frames, each of the plurality of transmission frames having an identifier;

initiating a first timer set to a first expiration period, wherein the first expiration period is determined by an average inter-arrival time period between transmitted frames, and if a second frame is not received prior to the expiration of the first expiration period, determining the identification and expected arrival time of a next frame, if a second frame is received prior to the expiration of the first expiration period, terminating the first timer, and initiating a second timer set to a second expiration period, wherein the second expiration period is given as a function of the first expiration period, on receipt of the second frame.

4. A wireless apparatus, comprising:

receiver for receiving a plurality of transmission frames;

means for detecting a frame;

timer means responsive to initiate a first timer on receipt of a first frame, the first timer having a first value and an associated expiration period, the timer means responsive to terminate the first timer on detection of a second frame, the timer means identifying an expected time of a next frame, wherein expiration of the first expiration period by the first timer indicates the second frame is a lost frame.

5. A wireless apparatus, comprising:

receiver for receiving a plurality of transmission frames;

means for detecting a frame;

timer means responsive to initiate a first timer on receipt of a first frame, the first timer having a first value and an associated expiration period, the timer means responsive to terminate the first timer on detection of a second frame, the timer means identifying an expected time of a next frame, wherein the timer means is operative to initiate a second timer in response to receipt of the second frame, the second timer having a second expiration period.

6. A wireless apparatus, comprising:

receiver for receiving a plurality of transmission frames;

means for detecting a frame;

timer means responsive to initiate a first timer on receipt of a first frame, the first timer having a first value and an associated expiration period, the timer means responsive to terminate the first timer on detection of a second frame, the timer means identifying an expected time of a next frame, wherein the timer means is operative to initiate a second timer in response to receipt of the second frame, the second timer having a second expiration period, wherein the second expiration period is a function of the first expiration period.

* * * * *